US012687206B2

(12) United States Patent
Roehm et al.

(10) Patent No.: US 12,687,206 B2
(45) Date of Patent: Jul. 21, 2026

(54) DRIVE DEVICE FOR A DRIVE UNIT OF AN ELECTRIC BIKE, DRIVE UNIT AND ELECTRIC BIKE

(71) Applicant: Robert Bosch GmbH, Stuttgart (DE)

(72) Inventors: Heiko Roehm, Stuttgart (DE); Julian Binder, Wannweil (DE); Dietmar Saur, Moessingen (DE); Christoph Zimmermann, Nehren (DE); Lukas Mueller, Stuttgart (DE); Wolfgang Hau, Metzingen (DE); Sigmund Braun, Kusterdingen (DE); Joachim Klima, Kusterdingen (DE); Stefan Holst, Reutlingen (DE); Alexander Nau, Eningen Unter Achalm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/844,949

(22) PCT Filed: Mar. 1, 2023

(86) PCT No.: PCT/EP2023/055143
§ 371 (c)(1),
(2) Date: Sep. 7, 2024

(87) PCT Pub. No.: WO2023/174689
PCT Pub. Date: Sep. 21, 2023

(65) Prior Publication Data
US 2025/0180080 A1　　Jun. 5, 2025

(30) Foreign Application Priority Data

Mar. 18, 2022　(DE) ..................... 10 2022 202 694.2
Feb. 24, 2023　(DE) ..................... 10 2023 201 702.4

(51) Int. Cl.
*F16D 41/26* (2006.01)
*B62M 6/55* (2010.01)
*F16D 41/28* (2006.01)

(52) U.S. Cl.
CPC ............... *F16D 41/26* (2013.01); *B62M 6/55* (2013.01); *F16D 41/28* (2013.01)

(58) Field of Classification Search
CPC ........... F16D 41/26; F16D 41/28; B62M 6/55
See application file for complete search history.

(56) References Cited

U.S. PATENT DOCUMENTS

2014/0138174 A1* 5/2014 Getta ...................... F16D 67/02
180/220
2022/0169335 A1* 6/2022 Von Lehmann ...... F16D 41/064

FOREIGN PATENT DOCUMENTS

DE 1 896 805 U 7/1964
DE 102019134685 B3 1/2021
DE 10 2019 215 712 A1 4/2021
(Continued)

OTHER PUBLICATIONS

WO2012025782 translation (Year: 2012).*
(Continued)

*Primary Examiner* — Timothy Hannon
(74) *Attorney, Agent, or Firm* — Maginot, Moore & Beck LLP

(57) ABSTRACT

A drive device for a drive unit of an electric bicycle has a bidirectional freewheeling assembly. The freewheeling assembly includes at least one clamping element unit.

20 Claims, 12 Drawing Sheets

(56) References Cited

FOREIGN PATENT DOCUMENTS

| | | | |
|---|---|---|---|
| EP | 1 457 414 A2 | | 9/2004 |
| EP | 3722193 A1 | | 10/2020 |
| JP | 2003-120715 A | | 4/2003 |
| JP | 2004324693 A | * | 11/2004 |
| WO | 2012/025876 A2 | | 3/2012 |
| WO | 2012025782 A1 | | 3/2012 |

OTHER PUBLICATIONS

JP-2004324693-A translation (Year: 2004).*
International Search Report corresponding to PCT Application No. PCT/EP2023/055143, mailed May 26, 2023. (German and English language document). (5 pages).

* cited by examiner

DRIVE DEVICE FOR A DRIVE UNIT OF AN ELECTRIC BIKE, DRIVE UNIT AND ELECTRIC BIKE

This application is a 35 U.S.C. § 371 National Stage Application of PCT/EP2023/055143, filed on Mar. 1, 2023 which claims the benefit of priority to (i) Serial No. DE 10 2022 202 694.2, filed on Mar. 18, 2022 in Germany, and (ii) Serial No. DE 10 2023 201 702.4, filed on Feb. 24, 2023 in Germany, the disclosures of which are incorporated herein by reference in their entirety.

BACKGROUND

A drive device for a drive unit of an electric bicycle, having a bidirectional freewheeling assembly, has already been proposed.

The disclosure proceeds from a drive device for a drive unit of an electric bicycle, having a bidirectional freewheeling assembly.

It is proposed that the freewheeling assembly comprises at least one clamping element unit. The freewheeling assembly is preferably configured as a freewheeling assembly based on a force-fit. The clamping element unit is preferably configured as a clamping member unit, as a clamping ball unit, or as a clamping roller unit. In particular, the freewheeling assembly is configured so as to be different from a ratchet freewheeling assembly. The drive unit preferably comprises an electric motor. The drive unit comprises in particular a gearbox for transmitting a driving force of the drive unit to an output sprocket of the drive unit. The output sprocket is configured, for example, as a chain ring or the like. The output sprocket is preferably connected to a gearbox output of the gearbox. The clamping element unit is preferably disposed on the gearbox output of the drive unit. Alternatively, it is also conceivable that the clamping element unit is disposed at another position within the gearbox. Alternatively, the drive device can also be used on a vehicle other than an electric bicycle. It is conceivable for the vehicle to comprise an internal combustion engine, an electric motor, or the like.

The drive device preferably comprises at least one force transmission element for transmitting a driving force of the drive unit. The clamping element unit is preferably disposed on the force transmission element. The force transmission element can be configured, for example, as a spur gear, as a planet gear, as a ring gear, as a sun gear or as any other force transmission element considered expedient by a person skilled in the art. The force transmission element preferably forms the gearbox output of the drive unit. Alternatively however, it is also conceivable for the force transmission element to be disposed within the gearbox and to be provided in particular for transmitting forces to a layshaft of the gearbox. The drive device preferably comprises at least one shaft. The shaft is preferably configured as an output shaft. Alternatively however, it is also conceivable for the shaft to be configured as a layshaft, which is in particular disposed within the gearbox, or the like. The output sprocket is preferably co-rotationally connected to the shaft configured as the output shaft. It is conceivable for the output sprocket to be configured so as to be integral to the output shaft. "Integral" can be understood to mean at least connected in a materially integral manner, for example by a welding process, an adhesive-bonding process, an overmoulding process, and/or any other process considered expedient by the person skilled in the art, and/or be understood to mean advantageously moulded in one piece, such as, for example, as a result of being produced from one casting and/or as a result of being produced in a single- or multi-component injection moulding method, and advantageously from a single blank.

The drive unit preferably comprises at least one pedal crankshaft. The pedal crankshaft is preferably able to be driven by a user by way of pedals. The drive device has in particular a forward rotation direction which corresponds in particular to a forward movement of the electric bicycle. The output sprocket is preferably connected to the pedal crankshaft in such a manner that the output sprocket is able to be driven by rotating the pedal crankshaft, in particular at least in one rotation direction, preferably in the direction of the forward rotation direction of the drive device. It is conceivable for the shaft to be connected so as to be rotatably mounted to the pedal crankshaft. Additionally, it is conceivable for the drive unit to have a further freewheeling assembly which is disposed between the shaft and the pedal crankshaft. The further freewheeling assembly is preferably provided to prevent any conjoint rotation of the pedal crankshaft in the event of a rotating shaft. Alternatively, it is conceivable for the shaft to be co-rotationally connected to the pedal crankshaft. Alternatively, it is in particular conceivable for the shaft to be configured so as to be integral to the pedal crankshaft. Furthermore alternatively, it is conceivable for the shaft to correspond to the pedal crankshaft. The shaft and the force transmission element are preferably disposed so as to be coaxial with a rotation axis of the freewheeling assembly. In particular, the shaft, the pedal crankshaft and/or the force transmission element are/is mounted so as to be rotatable about the rotation axis.

The clamping element unit is preferably specified to interrupt a transmission of a motor torque, which in terms of the forward direction of the electric bicycle is directed forwards, to the shaft, in particular the output sprocket, when a rotating speed of the shaft is higher than a rotating speed of the force transmission element driven by the motor torque. It is also conceivable for the clamping element unit to be specified to interrupt a transmission of a motor torque, which in terms of the forward direction of the electric bicycle is directed rearwards, to the shaft, in particular the output sprocket, when the rotating speed of the shaft, in particular of the output sprocket, is higher than the rotating speed of the force transmission element driven by the motor torque. The clamping element unit is preferably specified to interrupt a transmission of a torque of the shaft, in particular of the output sprocket, from the shaft, in particular the output sprocket, to the force transmission element, preferably the gearbox and/or the electric motor, when the shaft, in particular the output sprocket, in terms of the forward rotation direction, in particular the forward direction of the electric bicycle, rotates backwards. The clamping element unit is preferably specified to interrupt the transmission of the torque of the shaft, in particular of the output sprocket, from the shaft, in particular from the output sprocket, to the force transmission element, preferably to the gearbox and/or the electric motor, independently of the rotating speed of the force transmission element and independently of the rotating speed of the shaft, in particular of the output sprocket.

The clamping element unit preferably comprises at least one clamping element. The clamping element, in a clamped state of the clamping element, in particular between the force transmission element and the shaft, is preferably provided to transmit torque between the force transmission element and the shaft. The at least one clamping element, in a state of the clamping element decoupled from the force transmission element and/or the shaft, in particular in a freely rotating state of the clamping element, and/or a state of the clamping element spaced apart from the force transmission element and/or the shaft, is preferably provided to interrupt a transmission of torque between the force transmission element and the shaft. The clamping element is configured, for example, as a rolling member, as a, for example non-round, clamping member, or the like. The clamping element is preferably configured so as to be different from a ratchet. It is also conceivable for the clamping element unit to comprise a multiplicity of clamping elements, in particular at least two, preferably at least three, clamping elements.

As a result of the design embodiment according to the disclosure of the drive device, a bidirectional freewheeling assembly for a drive unit of an electric bicycle which has a particularly rapid response can advantageously be provided. A bidirectional freewheeling assembly for a drive unit of an electric bicycle which is particularly silent can advantageously be implemented. A particularly gentle operation of a drive unit, in particular of a gearbox and/or of an electric motor, can advantageously be implemented as a result of the drive device. Any undesirable transmission of torque from the shaft to the force transmission element as a result of a movement of the shaft in an arbitrary rotation direction can advantageously be counteracted. A transmission of undesirable torques from an output side to the electric motor and/or at least part of the gearbox can advantageously be counteracted.

It is furthermore proposed that the clamping element unit is provided for decoupling vibrations of a wrapping means. The wrapping means is configured, for example, as a chain, as a belt, or the like. The wrapping means is preferably co-rotationally connected to the output shaft, in particular the output sprocket. The wrapping means is in particular provided to transmit a driving force from the shaft, preferably configured as an output shaft, in particular from the output sprocket, to a drive wheel of the electric bicycle. The drive wheel is preferably configured as a rear wheel of the electric bicycle. Alternatively however, it is also conceivable for the drive wheel to be configured as a front wheel of the electric bicycle. The clamping element unit is preferably provided to counteract a transmission of vibrations of the wrapping means to components of the drive unit which, proceeding from the wrapping means, are disposed behind the clamping element unit in the drivetrain. The clamping element unit is preferably provided to counteract a transmission of vibrations of the wrapping means to the gearbox and/or the electric motor. A particularly gentle operation can advantageously be guaranteed. As a result of the use of the clamping element unit, a particularly durable drive device, preferably drive unit, in particular a particularly durable electric motor and/or a particularly durable gearbox, can advantageously be provided. Gearbox rattling can advantageously be counteracted. The decoupling of vibrations of a wrapping means can advantageously be performed in a particularly silent manner.

It is furthermore proposed that the clamping element unit comprises at least one rolling member, in particular a roller. Alternatively, it is also conceivable for the rolling member to be configured as a ball, as a drum, as a needle, as a cone, or as any other rotating member considered expedient by a person skilled in the art. The rolling member is preferably configured so as to be rotationally symmetrical. The at least one rolling member, in a clamped state of the rolling member, is preferably provided to transmit torque between the force transmission element and the shaft. The at least one rolling member, in a freely rotating state of the rolling member, is preferably provided to interrupt a transmission of torque between the force transmission element and the shaft. The clamping element unit preferably comprises a multiplicity of rolling members, in particular at least two, preferably at least three rolling members. The clamping element unit comprises, for example, at least one sleeve which is in particular disposed on the force transmission element. The sleeve is preferably co-rotationally connected to the force transmission element. The sleeve is preferably configured so as to be integral to the force transmission element. It is also conceivable for the sleeve to be formed by the force transmission element. The at least one rolling member is in particular disposed between the force transmission element, in particular the sleeve, and the shaft. The rolling members are preferably uniformly disposed. A multiplicity of rolling members are preferably disposed uniformly along a circumferential direction of the shaft, which preferably runs in a plane perpendicular to the rotation axis. The drive device preferably comprises at least one bearing unit which is at least partially disposed between the force transmission element, in particular the sleeve, and the shaft. The bearing unit is in particular at least provided to mount the force transmission element and the shaft so as to be mutually rotatable and/or at a fixed radial spacing relative to one another. The bearing unit preferably comprises at least one bearing element, for example a plain bearing ring or the like. The at least one bearing element is preferably disposed between the force transmission element, in particular the sleeve, and the shaft. The clamping element unit has in particular at least one clamping face. The force transmission element, in particular the sleeve, preferably comprises the at least one clamping face. The clamping face is in particular provided to interact with the at least one rolling member so as to transmit torque between the force transmission element and the shaft. The clamping element unit preferably has at least one further clamping face. The further clamping face is preferably provided to interact with the at least one rolling member so as to transmit torque between the force transmission element and the shaft. The shaft preferably has a circular-cylindrical shell face. The further clamping face is preferably formed by the circular-cylindrical shell face of the shaft. The at least one rolling member is particularly preferably provided to be clamped by the clamping face and the further clamping face so as to transmit torque between the force transmission element and the shaft. The force transmission element, in particular the sleeve, preferably has an internal face. The internal face faces towards the shaft in particular. The internal face preferably comprises the at least one clamping face. The force transmission element, in particular the sleeve, preferably has at least one recess for disposing the at least one rolling member. The at least one rolling member is able to be at least partially disposed in the at least one recess. The clamping face is preferably disposed in the at least one recess of the sleeve, in particular of the force transmission element. A number of recesses preferably corresponds to a number of rolling members of the clamping element unit. The at least one recess, in particular at least when viewed in a circumferential direction of the force transmission element, which preferably lies in a plane which runs perpendicularly to the rotation axis, is preferably configured so as to be asymmetrical. The at least one recess is preferably configured in such a manner that the at least one rolling member is able to be disposed in the recess in a clamping position on the clamping face and in a freely rotating position. A bidirectional freewheeling assembly which has a particularly rapid response can advantageously be implemented. A bidirectional freewheeling assembly for a drive unit of an electric bicycle which is particularly silent can advantageously be implemented.

It is furthermore proposed that the clamping element unit comprises a clamping element holding member. The clamping element holding member preferably has at least one receptacle region for the at least one clamping element, in particular the at least one rolling member. The clamping element holding member is preferably configured so as to be annular. The clamping element holding member is in particular configured as a cage ring. A number of receptacle regions preferably corresponds to the number of clamping elements, in particular rolling members, of the clamping element unit. The receptacle regions are preferably disposed so as to be separate from one another. The at least one receptacle region preferably delimits a movement of the at least one clamping element, in particular of the at least one rolling member, preferably about the rotation axis, preferably in the circumferential direction, relative to the clamping element holding member. The clamping element holding member is preferably disposed between the shaft and the force transmission element, in particular the sleeve. The clamping element holding member is preferably disposed so as to be movable relative to the force transmission element, in particular the sleeve, and/or the shaft. The clamping element holding member is in particular specified to guide the at least one rolling member. It is conceivable for the clamping element, in particular the rolling member, to be disposed without a spring on the clamping element holding member. The at least one receptacle region for the at least one clamping element, in particular the at least one rolling member, is preferably free of spring elements. In particular, a region between the at least one clamping element, preferably the at least one rolling member, and the clamping element holding member, in particular at least in the receptacle region, is free of spring elements. The at least one clamping element, in particular the at least one rolling member, is preferably free of a mounting by means of spring elements on the clamping element holding member. Alternatively however, it is also conceivable that the at least one clamping element, in particular the at least one rolling member, is disposed so as to be spring-mounted on the clamping element holding member, preferably in the at least one receptacle region. For example, a bearing spring for resilient mounting of the at least one clamping element is disposed between the at least one clamping element, in particular the at least one rolling member, and the clamping element holding member, preferably in the receptacle region. The bearing spring is configured, for example, as a flexible spring, as a torsion spring, as a rubber-elastic element, or the like. It is conceivable for the bearing spring to be fastened to the clamping element holding member. It is also conceivable for the bearing spring to be configured so as to be integral to the clamping element holding member. A particularly reliable function of the clamping element unit can advantageously be implemented. A bidirectional freewheeling assembly which is particularly reliable can advantageously be made available.

It is furthermore proposed that the clamping element unit comprises a mechanical control unit. The control unit is preferably provided for changing between a freewheeling state and a torque-transmitting state of the freewheeling assembly. The freewheeling state is preferably a state of the freewheeling assembly in which a transmission of torque between the force transmission element and the shaft is interrupted. The torque-transmitting state is preferably a state of the freewheeling assembly in which a transmission of torque between the force transmission element and the shaft takes place. A changeover between the freewheeling state and the torque-transmitting state preferably takes place automatically by means of the control unit, in particular free of any intervention by a user and/or free of any electronic control. The control unit is preferably free of electrical components. Alternatively however, it is also conceivable for the clamping element unit to comprise an electronic control unit. An electrical energy supply for controlling the clamping element unit can advantageously be dispensed with.

Moreover, it is proposed that the control unit has a friction unit which is provided for generating an actuating force. The friction unit is provided in particular to move the clamping element holding member relative to the force transmission element and/or the shaft, preferably to rotate said clamping element holding member about the rotation axis. The friction unit is particularly preferably at least provided to release a torque-transmitting state of the freewheeling assembly as a function of a relative movement of the force transmission element to the shaft. The friction unit, as a function of a relative movement of the force transmission element to the shaft, is preferably at least provided to switch the freewheeling assembly by the actuating force from the torque-transmitting state of the freewheeling assembly to the freewheeling state of the freewheeling assembly. The friction unit is in particular provided to position the at least one rolling member relative to the force transmission element, in particular the sleeve, and/or the shaft, preferably so as to switch the freewheeling assembly, preferably at least from the torque-transmitting state to the freewheeling state. The friction unit is provided to generate a frictional force between the clamping element holding member and a friction member which is configured separately from the clamping element holding member. Frictional contact between the clamping element holding member and the friction member is preferably formed by the friction unit. The friction unit has in particular at least one friction element. The friction unit preferably comprises a multiplicity of friction elements, preferably at least two, particularly preferably at least three friction elements. The at least one friction element is provided for forming the frictional contact between the clamping element holding member and the friction member. The at least one friction element preferably has at least one friction face for forming the frictional contact between the clamping element holding member and the friction member. The at least one friction element is preferably fastened to the clamping element holding member. It is conceivable for the at least one friction element to be configured so as to be integral to the clamping element holding member or to be separate from the clamping element holding member. Alternatively, it is also conceivable for the at least one friction element to be fastened to the friction member, in particular to be configured so as to be integral to the friction member. The friction element is preferably configured as a spring-elastic element, as a rubber-elastic element, or as any other friction element considered expedient by a person skilled in the art. The friction member is preferably formed by a stationary component of the freewheeling assembly. In at least one exemplary embodiment in particular, the friction member is co-rotationally connected to a housing component of a housing of the drive unit. The friction member is configured, for example, as a friction ring or the like. Alternatively, it is also conceivable for the friction member to be formed by a stationary component of the electric bicycle, in particular of the drive unit. Alternatively, the friction member is formed, for example, by a frame element of the frame of the electric bicycle, by the housing component of the housing of the drive unit, or the like. The actuating force is preferably a frictional force. In particular, the friction unit, in at least one operating state of the freewheeling assembly, is provided to generate the actuating force by static friction and/or dynamic friction between the clamping element holding member and the friction member. The actuating force, in particular the frictional force, at least in the operating state of the freewheeling assembly, preferably acts counter to a torque prevailing on the clamping element holding member. The actuating force, preferably the frictional force, is preferably provided to decelerate a rotation of the clamping element holding member about the rotation axis relative to the shaft, in particular at least in the freewheeling state. The clamping element unit, by means of the at least one clamping face, is preferably specified to clamp the at least rolling member in the at least one recess when the rotating speed of the force transmission element in the forward rotation direction is more than or equal to the rotating speed of the shaft. The friction unit, during a rotation of the force transmission element in the forward rotation direction, wherein a rotating speed of the force transmission element is more than a rotating speed of the shaft, by means of the actuating force, in particular the frictional force, is preferably provided to brake the clamping element holding member relative to the force transmission element, so as to preferably bring into contact the at least one rolling member with the at least one clamping face in the at least one recess of the force transmission element, in particular the sleeve, and to clamp said rolling member. In particular, the clamping element unit, by way of the actuating force, preferably the frictional force, during a rotation of the shaft which in terms of the forward rotation direction is directed backwards, is provided to generate a force on the at least one rolling member, so as to preferably release the at least one rolling member from the at least one clamping face so that the freewheeling assembly is preferably switched to the freewheeling state. Clamping of the at least one rolling member by way of the force transmission element, in particular the sleeve, and the shaft can preferably be generated by the actuating force, in particular the frictional force, when the rotating speed of the force transmission element is higher than the rotating speed of the shaft, preferably at least during a rotation of the force transmission element which in terms of the forward rotation direction is directed forwards. As a result of the clamping of the at least one rolling member by way of the force transmission element, in particular the sleeve, and the shaft, a torque is preferably able to be transmitted between the force transmission element and the shaft. The at least one rolling member in the torque-transmitting state is preferably co-rotationally connected to the force transmission element, in particular the sleeve, and the shaft. The at least one rolling member is in the clamping position in particular when the freewheeling assembly is in the torque-transmitting state. The at least one rolling member in the freewheeling state is preferably disposed so as to freely rotate in the at least one recess. The at least one rolling member is preferably in a freely rotating position when the freewheeling assembly is in the freewheeling state. In particular, the at least one rolling member is disposed so as to freely rotate in the at least one recess when the shaft in terms of the forward rotation direction rotates backwards. The at least one rolling member is preferably disposed so as to freely rotate in the at least one recess when the shaft in terms of the forward rotation direction rotates forwards, and the rotating speed of the shaft is higher than the rotating speed of the force transmission element. The at least one rolling member is preferably disposed so as to freely rotate in the at least one recess when the force transmission element in terms of the forward rotation direction rotates backwards. The clamping element unit, by means of the clamping element holding member, is in particular provided to release the at least one rolling member from the clamping action when the rotating speed of the shaft is higher than the rotating speed of the force transmission element. A mechanical control unit for the clamping element unit can advantageously be implemented in a structurally simple manner. Particularly robust mechanical control for the clamping element unit can advantageously be made available.

It is furthermore proposed that the friction unit has at least one spring unit. The clamping element holding member is preferably connected to the friction member by way of the spring unit. The spring unit is preferably provided to generate a holding force between the clamping element holding member and the friction member. The spring unit is preferably provided to generate the actuating force, in particular the frictional force, of the friction unit. The spring unit has at least one spring element, for example. The at least one friction element is preferably formed by the at least one spring element. It is conceivable for the at least one spring element to be configured as a flexible spring, as a torsion spring, as a plate spring, as a volute spring, as an annular spring, or the like. Alternatively, it is also conceivable for the spring element to be configured as a rubber-elastic element. The at least one spring element is preferably disposed on the clamping element holding member. The at least one spring element is preferably disposed between the clamping element holding member and the friction member. In particular, the clamping element holding member is able to be connected to the friction member by way of the at least one spring element. A mechanical control unit for the clamping element unit can advantageously be implemented by way of a simple construction. Particularly robust mechanical control for the clamping element unit can advantageously be made available. Particularly effective frictional contact between the clamping element holding member and the friction member can advantageously be implemented.

It is furthermore proposed that the spring unit comprises at least one flexible spring. The at least one flexible spring is formed by the at least one spring element, for example. The spring unit is preferably configured so as to be free of coil springs. The at least one flexible spring is configured, for example, as a leaf spring, as a wire spring, in particular as a needle spring, as a leg spring, or the like. Particularly effective frictional contact between the clamping element holding member and the friction member can advantageously be implemented.

It is furthermore proposed that the spring unit comprises at least one leaf spring. The at least one leaf spring is preferably formed by the at least one spring element, in particular the at least one flexible spring. It is conceivable for the leaf spring to be configured as a spiral spring, as a cushioning spring, as an elliptic spring, as a parabolic spring, as a serpentine spring, or as any other leaf spring considered expedient by a person skilled in the art. The leaf spring preferably has at least one spring arm. The at least one friction face of the friction unit is in particular disposed on the at least one spring element, in particular on the leaf spring. The friction face of the friction element is preferably disposed on the at least one spring arm. It is conceivable for the leaf spring to be configured as a single-arm leaf spring or as a leaf spring having at least two arms. It is conceivable for the friction face to extend in the axial direction and/or in the radial direction. It is conceivable for the friction face to be at least partially curved and/or to run so as to be at least partially rectilinear. At least one plane of main extent of the at least axially extending friction face preferably runs so as to be at least substantially parallel to the axial direction. A "plane of main extent" of a module or of an element can be understood to be a plane which is parallel to a largest lateral face of a smallest possible imaginary cuboid which just completely encloses the module or the element and runs in particular through the centre of the cuboid. "Substantially parallel" can be understood here to be an alignment in a direction relative to a reference direction, in particular in a plane, wherein the direction in relation to the reference direction has a deviation of in particular less than 8°, advantageously less than 5°, and particularly advantageously less than 2°. At least the plane of main extent of the at least radially extending friction face preferably runs so as to be at least substantially parallel to the radial direction. It is conceivable for the friction face, which extends in particular in the axial direction, to be oriented radially inwards or radially outwards. It is also conceivable for the friction face, which extends in particular in the radial direction, to be oriented in the direction of the clamping element holding member, or so as to face away from the clamping element holding member, preferably at least when viewed in the axial direction. Particularly effective frictional contact between the clamping element holding member and the friction member can advantageously be implemented.

It is moreover proposed that the leaf spring is configured as a leaf spring having at least two arms. The leaf spring having at least two arms preferably has at least two friction faces of the friction unit so as to form the friction contact between the clamping element holding member and the friction member. The spring having at least two arms has in particular at least two spring arms. One of the friction faces is in each case preferably disposed on the spring arms. Particularly effective frictional contact between the clamping element holding member and the friction member can advantageously be implemented by the two-arm leaf spring. A particularly large friction face can advantageously be implemented.

It is furthermore proposed that the spring unit has at least one, in particular the spring element already mentioned above, which at least to a major extent surrounds a, in particular the rotation axis, already mentioned above, of the freewheeling assembly. An element surrounding an axis at least to a major extent is to be understood to mean in particular that the element surrounds the axis to the extent of at least 55%, preferably to the extent of at least 65%, preferably to the extent of at least 75%, particularly preferably to the extent of at least 85%, and most particularly preferably at least to the extent of at least 95%, in a circumferential direction, which lies in a plane running perpendicularly to the axis, of the axis. The spring element which surrounds the rotation axis of the freewheeling assembly at least to a major extent is preferably configured so as to be annular. It is conceivable for the at least one spring element which surrounds the rotation axis of the freewheeling assembly at least to a major extent has at least in part a curved profile along the main extent thereof and/or along the main extent thereof has portions that run in a rectilinear manner and are angled at least in part in relation to one another. A spring unit which in terms of construction can be implemented in a particularly simple manner can advantageously be made available. In particular, many contact points between the at least one spring element and the clamping element holding member can advantageously be implemented. In particular, many contact points between the at least one spring element and the friction member can advantageously be implemented. Particularly effective and/or uniform frictional contact between the clamping element holding member and the friction member can advantageously be implemented. A spring unit having a particularly small number of components can advantageously be implemented. Particularly simple and rapid assembling of the spring unit on the clamping element holding member can advantageously be implemented.

It is furthermore proposed that the spring unit has at least one spring element, in particular the spring element already mentioned above, having at least one assembly ramp. The assembly ramp is in particular provided to guide the at least one spring element when assembling the spring element on the friction member. The assembly ramp is preferably provided to contact the friction member when the spring element is assembled on the friction member, and in particular to guide the spring element in a movement in the direction of an envisaged assembly position. The at least one assembly ramp is preferably disposed on the at least one spring arm of the spring element configured as a leaf spring. The assembly ramp is in particular formed by a face which runs so as to be angled in relation to the rotation axis, preferably in a manner other than perpendicularly. Particularly simple and/or rapid assembling of the clamping element unit on the friction member can advantageously be implemented. Particularly rapid and cost-effective production of a bidirectional freewheeling assembly having a clamping element unit can advantageously be achieved.

It is furthermore proposed that the spring unit has at least one spring element, in particular the spring element already mentioned above, which is configured separately from the clamping element holding member. It is conceivable for the spring element, configured separately from the clamping element holding member, to be fastened to the clamping element holding member or to be fastened to the friction member, in particular to be configured so as to be integral to the friction member. It is also conceivable for the spring element, configured separately from the clamping element holding member, to be at least partially formed from a material which corresponds to a material of the clamping element holding member, or is different from the material of the clamping element holding member. For example, the clamping element holding member is formed from a plastics material. Alternatively however, it is also conceivable for the clamping element holding member to be formed from a metal or any other material considered expedient by a person skilled in the art. The at least one spring element is preferably formed from a metal. Alternatively however, it is also conceivable that the spring element is formed from a plastics material or any other material considered expedient by a person skilled in the art. Different materials can advantageously be used for the at least one spring element and the clamping element holding member. The materials for the clamping element holding member and the at least one spring element can advantageously be chosen so as to be particularly suitable. The materials for the clamping element unit can advantageously be chosen in a particularly flexible manner at least in terms of costs, stability, weight and/or durability.

It is furthermore proposed that the spring unit has at least one spring element, in particular the spring element already mentioned above, which is fastened to a member that is separate from the clamping element holding member. The member is preferably a stationary component of the freewheeling assembly or of the electric bicycle, in particular of the drive unit. For example, the member is formed by the housing component of the drive unit, the frame element, or the like. It is conceivable for the member to be formed by the friction member. It is conceivable for the at least one spring element to be configured so as to be integral to the member, or to be fastened on the member so as to be releasable, preferably in a non-destructive manner. A total mass of moving parts of the drive device can advantageously be kept low. Undesirable inertial forces can advantageously be kept low. A clamping element unit for the bidirectional freewheeling assembly, which has a particularly rapid response, can advantageously be made available.

It is furthermore proposed that the spring unit has at least one spring element, in particular the spring element already mentioned above, which is fastened to the clamping element holding member. For example, the spring element is configured so as to be integral to the clamping element holding member, is latched, clamped, screwed to the clamping element holding member, or the like. Particularly reliable positioning of the spring element can advantageously be achieved. Particularly reliable and precise functioning of the clamping element unit, preferably of the control unit, can advantageously be implemented.

It is moreover proposed that the spring unit has at least one spring element, in particular the spring element already mentioned above, which is configured so as to be integral to the clamping element holding member. A particularly robust clamping element unit can advantageously be made available. A particularly secure connection between the clamping element holding member and the spring elements can advantageously be achieved. A control unit for controlling the clamping element unit with particularly high reliability can advantageously be implemented.

It is furthermore proposed that the spring unit has at least one spring element, in particular the spring element already mentioned above, which is overmoulded by the clamping element holding member. The spring element is preferably at least partially overmoulded by the clamping element holding member. A particularly secure connection between the clamping element holding member and the spring elements can advantageously be achieved. A control unit for controlling the clamping element unit with particularly high reliability can advantageously be implemented. The at least one spring element is advantageously disposed in a particularly captive manner.

It is furthermore proposed that the friction unit comprises a friction face, in particular the friction face already mentioned above, which extends in the axial direction. The axial direction preferably runs parallel to the rotation axis. A particularly compact construction mode of the drive device at least in the radial direction can advantageously be achieved.

It is furthermore proposed that the friction face extending in the axial direction, when viewed in the axial direction, is disposed on a side that faces the clamping element holding member. In at least one exemplary embodiment, the at least one spring arm of the spring element is preferably disposed on that side that faces the clamping element holding member, in particular at least when viewed in the axial direction. A particularly compact clamping element unit for the bidirectional freewheeling assembly can advantageously be implemented.

It is moreover proposed that the friction face extending in the axial direction, when viewed in the axial direction, is disposed on a side that faces away from the clamping element holding member. In at least one exemplary embodiment, the at least one spring arm of the spring element is preferably disposed on that side that faces away from the clamping element holding member, in particular at least when viewed in the axial direction. Particularly simple assembling of the clamping element holding member on the friction member can advantageously be achieved.

It is furthermore proposed that, in particular in at least one exemplary embodiment, the friction face extending in the axial direction, when viewed in the radial direction, is oriented inwards. The at least one friction face in at least one exemplary embodiment is preferably disposed so as to face the shaft. The at least one friction face in at least one exemplary embodiment is in particular disposed so as to face the rotation axis. A particularly compact clamping element unit having a friction unit can advantageously be implemented. A freewheeling assembly with a particularly rapid response and a particularly compact construction mode can advantageously be made available.

It is furthermore proposed that the friction unit comprises at least two friction elements, in particular the friction elements already mentioned above, for generating an actuating force, wherein the friction elements are disposed uniformly in a circumferential direction of the clamping element holding member, said circumferential direction running in particular in a plane perpendicular to the rotation axis. The friction elements are preferably disposed uniformly in the circumferential direction on the clamping element holding member or the friction member. The friction elements are preferably formed by spring elements of the spring unit. Alternatively however, it is also conceivable for the friction elements to be disposed non-uniformly in the circumferential direction, preferably on the clamping element holding member or the friction member. A particularly uniform holding force and/or frictional force between the clamping element holding member and the friction member can advantageously be implemented. Particularly reliable and precise functioning of the clamping element unit for the bidirectional freewheeling assembly can advantageously be made available.

It is moreover proposed that the drive device comprises at least one force transmission element, in particular the force transmission element already mentioned above, for transmitting a driving force of the drive unit, said force transmission element having at least one lead through by way of which the clamping element holding member in the radial direction is at least partially guided towards the outside. It is conceivable for a number of lead throughs to correspond to a number of friction elements, in particular spring elements. However, it is also conceivable for the number of lead throughs to differ from a number of friction elements, in particular spring elements. The at least one friction element, preferably the at least one spring element, in particular in at least one exemplary embodiment, is at least partially disposed in the at least one lead through. The at least one lead through in particular in at least one exemplary embodiment is free of friction elements, in particular spring elements. A bidirectional freewheeling assembly which has a particularly rapid response can advantageously be embodied in a particularly compact manner. Weight can advantageously be saved as a result of the design embodiment of the force transmission element with lead throughs.

It is furthermore proposed that the drive device comprises at least one force transmission element, in particular the force transmission element already mentioned above, for transmitting a driving force of the drive unit, wherein the force transmission element is configured as a spur gear. The spur gear preferably has an external toothing. It is conceivable for the external toothing to be configured as a spur toothing or as a helical toothing. Particularly simple assembling of the clamping element unit on the force transmission element can advantageously be achieved.

It is furthermore proposed that a value of a maximum diameter of the at least one rolling member is between 6% and 20% of a value of a maximum internal diameter of the force transmission element, in particular of the sleeve. A value of the maximum diameter of the at least one rolling member is preferably at most 15%, particularly preferably at most 10%, of a value of the maximum internal diameter of the force transmission element, in particular of the sleeve. Alternatively however, it is also conceivable for a value of the maximum diameter of the at least one rolling member to be outside a range of 6% to 20% of a value of the maximum internal diameter of the force transmission element, in particular of the sleeve. The internal diameter is in particular measured in the radial direction. The maximum diameter of the rolling member is preferably measured in the radial direction. A clamping element unit having a particularly high packing density in terms of the rolling members can advantageously be achieved. A particularly reliable and precise bidirectional freewheeling assembly can advantageously be implemented as a result of the high packing density of the rolling members in the clamping element holding member.

It is furthermore proposed that the drive device comprises at least one shaft, in particular the shaft already mentioned above, wherein a value of a maximum diameter, in particular of the diameter already mentioned above, of the at least one rolling member is between 8% and 25% of a value of a maximum diameter of the shaft. A value of the maximum diameter of the at least one rolling member is preferably at most 15%, particularly preferably at most 12%, of a value of the maximum diameter of the shaft. Alternatively however, it is also conceivable for a value of the maximum diameter of the at least one rolling member to be outside a range of 8% to 25% of a value of the maximum diameter of the shaft. The maximum diameter of the shaft is in particular measured in the radial direction. A value of the maximum diameter of the shaft is in particular at most 38 mm; a value of the maximum diameter of the shaft is particularly preferably 32 mm. A clamping element unit having a particularly high packing density in terms of the rolling members can advantageously be achieved. A particularly reliable and precise bidirectional freewheeling assembly can advantageously be implemented as a result of the high packing density of the rolling members in the clamping element holding member.

It is moreover proposed that a value of a maximum internal diameter, in particular of the internal diameter already mentioned above, of the force transmission element, in particular of the sleeve, is at most 46 mm. A value of the maximum internal diameter of the force transmission element, in particular of the sleeve, is preferably between 40 mm and 41 mm. Alternatively however, it is also conceivable for a value of the maximum internal diameter of the force transmission element to be more than 46 mm. A particularly compact drive device having a bidirectional freewheeling assembly can advantageously be made available.

It is furthermore proposed that a value of a maximum diameter, in particular of the diameter already mentioned above, of the rolling member is at most 5 mm. A value of the maximum diameter of the rolling member is preferably substantially 3.5 mm. A variable being at least substantially a stated value is to be understood to mean in particular that an actual value of the variable deviates from the stated value by at most 10%, particularly preferably at most 5%. Alternatively however, it is also conceivable for a value of the maximum diameter of the rolling member to be more than 5 mm. A particularly compact drive device having a bidirectional freewheeling assembly can advantageously be made available. A clamping element unit having a particularly high packing density in terms of the rolling members can advantageously be achieved. A particularly reliable and precise bidirectional freewheeling assembly can advantageously be implemented as a result of the high packing density of the rolling members in the clamping element holding member.

It is furthermore proposed that a maximum motion angle, in particular a translatory angle, of the rolling member relative to the clamping element holding member about a rotation axis, in particular the rotation axis already mentioned above, of the freewheeling assembly is at most 1.5°. The maximum motion angle, in particular translatory angle, of the at least one rolling member relative to the clamping element holding member is preferably between 0° and 1°. In particular in an exemplary embodiment in which the rolling member is disposed so as to be spring-mounted on the clamping element holding member. The maximum motion angle, in particular translatory angle, of the at least one rolling member relative to the clamping element holding member is particularly preferably substantially 0.5°. Alternatively however, it is also conceivable for the maximum motion angle, in particular translatory angle, of the at least one rolling member relative to the clamping element holding member about the rotation axis to be more than 1.5°. A precise bidirectional freewheeling assembly which has a particularly rapid response can advantageously be made available.

It is furthermore proposed that a maximum angle between a clamping position, in particular the clamping position already mentioned above, of the rolling member and a maximum freely rotating position of the rolling member about a rotation axis, in particular the rotation axis already mentioned above, of the freewheeling assembly is at most 5°. The maximum angle between the clamping position of the rolling member and the maximum freely rotating position of the rolling member about the rotation axis of the freewheeling assembly is preferably at most 2.5°. The maximum angle between the clamping position of the rolling member and the maximum freely rotating position of the rolling member about the rotation axis of the freewheeling assembly is preferably between 0.3° and 2.5°, particularly preferably between 0.4° and 2°. The maximum angle between the clamping position of the at least one rolling member and the maximum freely rotating position of the at least one rolling member about the rotation axis is very particularly preferably at least substantially 0.8°. The maximum freely rotating position and/or the clamping position of the rolling member are/is located in particular in the at least one recess for the at least one rolling member. The maximum freely rotating position and the clamping position are preferably located at mutually opposite end regions of the recess. The at least one further clamping face is preferably disposed on a rear side of the recess in terms of the forward rotation direction. The freely rotating position is preferably disposed on a front side of the recess in terms of the forward rotation direction. In particular, the recess, in the end region in which the freely rotating position of the at least one rolling member is in particular located, has a detent for the at least one rolling member. The rolling member is in particular in the maximum freely rotating position when the rolling member bears on the detent of the recess. Alternatively, it is also conceivable for the maximum angle between the clamping position and the maximum freely rotating position of the rolling member about the rotation axis of the freewheeling assembly to be more than 5°. A precise bidirectional freewheeling assembly which has a particularly fast response can advantageously be made available.

It is moreover proposed that the clamping element unit and the force transmission element have a common section plane which runs so as to be at least substantially perpendicular to a rotation axis, in particular the rotation axis already mentioned above, of the freewheeling assembly. "Substantially perpendicular" can be understood to mean an orientation of a direction relative to a reference direction, wherein the direction and the reference direction, in particular when viewed in a projection plane, enclose an angle of 90° and the angle has a maximum deviation of in particular less than 8°, advantageously less than 5°, and particularly advantageously less than 2°. The clamping element unit is preferably at least partially, preferably at least substantially completely, disposed within the force transmission element. An element being at least substantially completely disposed within a further element is to be understood to mean in particular that the element is disposed within the further element to an extent of at least 50%, preferably to an extent of at least 75%, and particularly preferably to an extent of at least 90%, of a total volume and/or a total mass of the element. The friction unit, in particular the spring unit, in at least one exemplary embodiment is particularly preferably disposed completely within the force transmission element. Alternatively, it is also conceivable for the clamping element unit to be disposed offset in relation to the force transmission element in the axial direction in such a manner that at least the external toothing of the force transmission element and the clamping element unit are free of a common section plane which runs so as to be at least substantially perpendicular to the rotation axis. A particularly compact drive device having a bidirectional freewheeling assembly which has a particularly rapid response can advantageously be made available. Damage to the clamping element unit, in particular contamination of the latter, can advantageously be counteracted.

It is furthermore proposed that a sum of a clamping element holding member angle and a spring angle is smaller than a sleeve clearance angle or is equal to the sleeve clearance angle. The clamping element holding member angle is in particular formed by a sum of a clamping element holding member clearance angle and a clamping element holding member load angle. The clamping element holding member angle is preferably at most 2.5°.

The clamping element holding member angle is particularly preferably substantially 1.8°. Alternatively however, it is also conceivable for the clamping element holding member angle to be more than 2.5°. The clamping element holding member clearance angle corresponds in particular to the maximum motion angle, in particular translatory angle, of the rolling member relative to the clamping element holding member about the rotation axis of the freewheeling assembly. The clamping element holding member load angle is in particular a sum of a mechanical clamping element holding member load angle and a chemical and/or thermal clamping element holding member load angle. The clamping element holding member load angle is preferably at most 1°. The clamping element holding member load angle is particularly preferably substantially 0.8°. Alternatively however, it is also conceivable for the clamping element holding member load angle to be more than 1°. The mechanical clamping element holding member load angle is in particular a function of potential mechanical deformations in terms of the clamping element holding member in the operation of the clamping element unit. The mechanical clamping element holding member load angle is preferably at most 0.7°. The mechanical clamping element holding member load angle is particularly preferably substantially 0.5°. Alternatively however, it is also conceivable for a value of the mechanical clamping element holding member load angle to be more than 0.7°. The chemical and/or thermal clamping element holding member load angle is in particular a function of the clamping element holding member in terms of a potential thermal expansion, a potential swelling of the material, for example as a result of absorbing moisture, or the like. The chemical and/or thermal clamping element holding member load angle is preferably at most 0.5°. The chemical and/or thermal clamping element holding member load angle is particularly preferably substantially 0.3°. Alternatively however, it is also conceivable for a value of the chemical and/or thermal clamping element holding member load angle to be more than 0.5°. The sleeve clearance angle preferably corresponds to the maximum angle between the clamping position of the at least one rolling member and the maximum freely rotating position of the at least one rolling member. A sum of the sleeve clearance angle and a sleeve load angle results in particular in a sleeve angle. The sleeve angle is preferably at most 6.5°, preferably at most 3.5°. The sleeve angle is particularly preferably substantially 3.3°. Alternatively however, it is also conceivable for the sleeve angle to be more than 6.5°. The sleeve load angle is preferably at least a function of a potential deformation and/or expansion of the force transmission element, in particular of the sleeve, preferably of the at least one clamping face, in the operation of the clamping element unit. The sleeve load angle is preferably at most 4°, preferably at most 2°. The sleeve load angle is most particularly preferably at least substantially 2.5°. Alternatively however, it is also conceivable for the sleeve load angle to have a value which is more than 4°. The spring angle is in particular a sum of a spring clearance angle and a spring load angle. The spring angle is preferably at most 0.1°. The spring angle is particularly preferably substantially 0.05°. Alternatively however, it is also conceivable for the spring angle to be more than 0.1°. The spring clearance angle relates in particular to potential play in the connection between the clamping element holding member and the spring unit, in particular the at least one spring element. The spring load angle is in particular a function of potential bending of the at least one spring element. The spring load angle is preferably at most 0.1°. The spring load angle is particularly preferably substantially 0.05°. Alternatively however, it is also conceivable for the spring load angle to be more than 1°. Particularly reliable functioning of the clamping element unit for the bidirectional freewheeling assembly can advantageously be implemented.

Furthermore proposed is a drive unit for an electric bicycle having a drive device according to the disclosure. The drive device is in particular at least partially, preferably at least to a major extent, disposed within the housing of the drive unit. The electric motor and/or the gearbox are/is preferably at least to a major extent disposed within the housing. A particularly robust and/or durable drive unit can advantageously be made available. The drive unit can advantageously be operated in a particularly gentle manner.

Furthermore proposed is an electric bicycle having a drive unit according to the disclosure. The drive unit, in particular the housing of the drive unit, is preferably fastened to the frame of the electric bicycle. The electric bicycle preferably comprises the wrapping means. It is conceivable that at least the housing of the drive unit is configured so as to be at least partially integral to at least one part of the frame. An electric bicycle having a bidirectional freewheeling assembly which has a particularly rapid response can advantageously be made available. A particularly precise travelling behaviour, in particular drive behaviour, can advantageously be implemented.

The drive device according to the disclosure, the drive unit according to the disclosure and/or the electric bicycle according to the disclosure are/is not intended here to be limited to the application and embodiment described above. The drive device according to the disclosure, the drive unit according to the disclosure and/or the electric bicycle according to the disclosure for fulfilling a functional mode described herein can in particular have a number deviating from a number of individual elements, components and units mentioned herein. Moreover, the ranges of values specified in this disclosure and values lying within said limits should be considered to be disclosed and able to be used in any desired manner.

BRIEF DESCRIPTION OF THE DRAWINGS

Further advantages are derived from the following description of the drawing. Eight exemplary embodiments of the disclosure are illustrated in the drawing. The drawing, the description and the claims contain numerous features in combination. The person skilled in the art will expediently also consider the features individually and combine them so as to form meaningful further combinations.

In the drawing.

DETAILED DESCRIPTION

Figure 1:
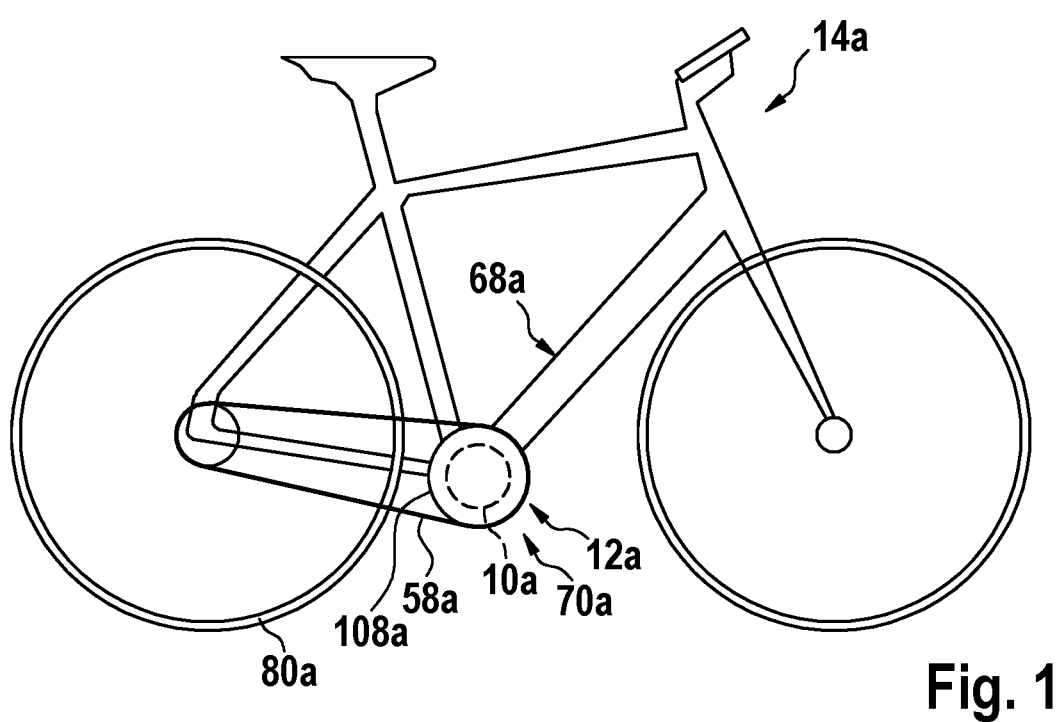
FIG. 1 shows an electric bicycle according to the disclosure, having a drive unit according to the disclosure in a schematic illustration.
Figure 3:
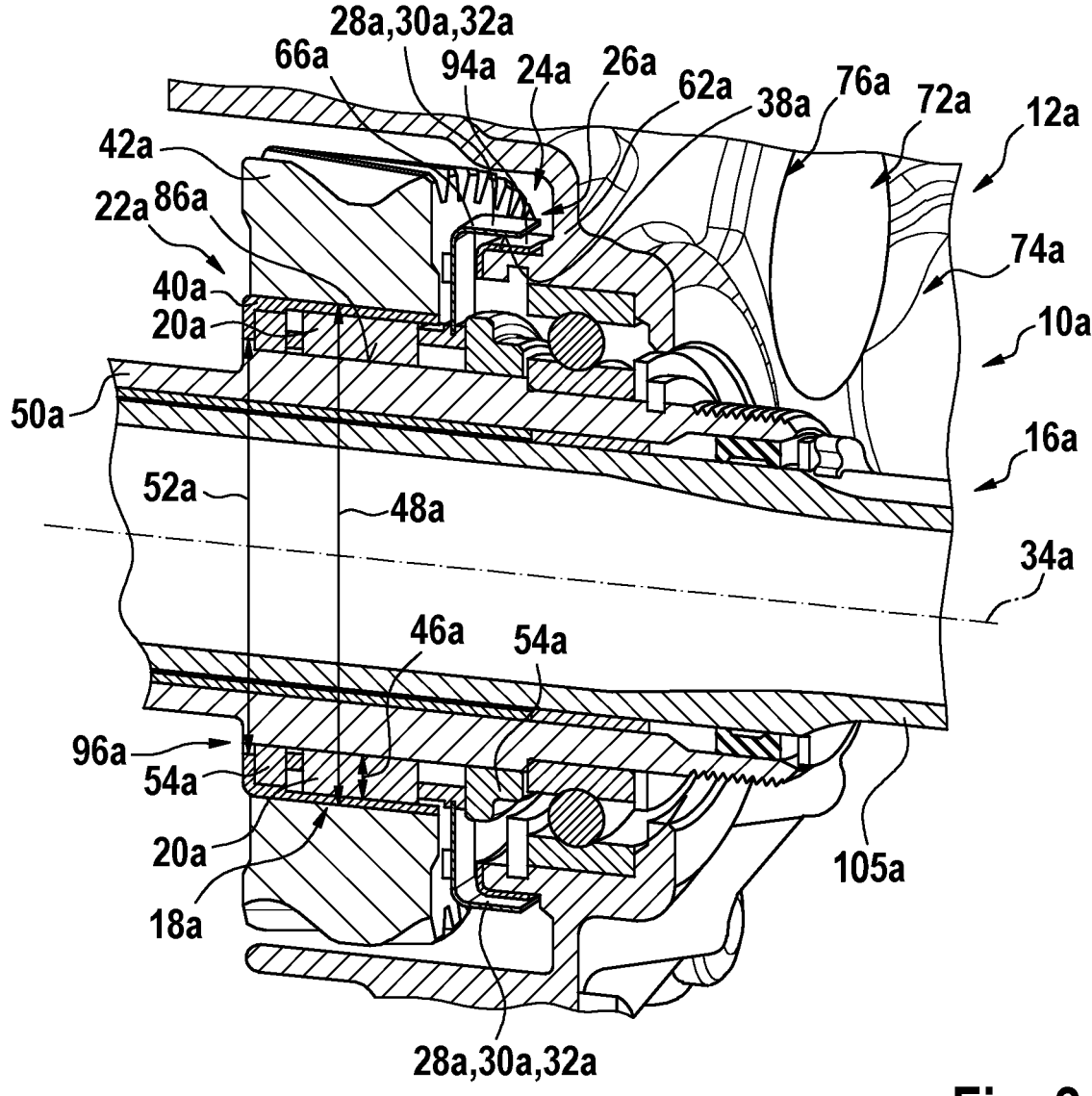
FIG. 3 shows the drive unit in a perspective sectional illustration.

FIG. 1 shows an electric bicycle 14a. The electric bicycle 14a has a frame 68a. The electric bicycle 14a comprises a drive unit 12a. The drive unit 12a is disposed on the frame 68a. The drive unit 12a is disposed in a bottom bracket bearing region 70a of the electric bicycle 14a. The drive unit 12a comprises a housing 72a (cf. FIG. 3). The drive unit 12a comprises an electric motor 74a. The drive unit 12a comprises a gearbox 76a for transmitting a driving force of the drive unit 12a, in particular of the electric motor 74a, to an output sprocket 108a of the drive unit 12a. The output sprocket 108a is configured as a chainring or the like. The output sprocket 108a is connected to a gearbox output of the gearbox 76a.

Figure 2:
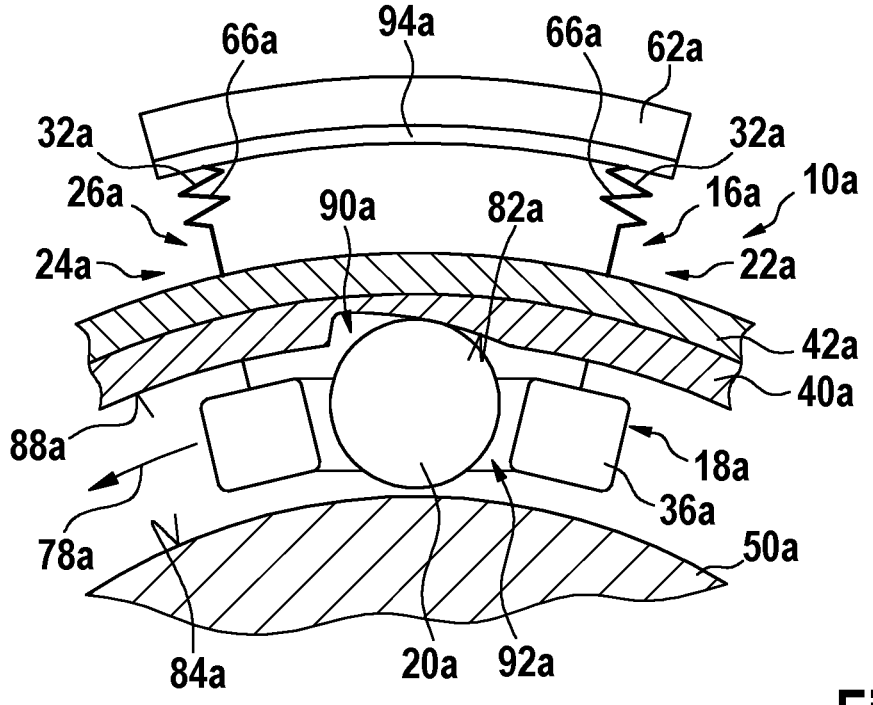
FIG. 2 shows a simplified schematic illustration of a drive device according to the disclosure of the drive unit.

The drive unit 12a comprises at least one drive device 10a. The drive device 10a is at least partially, preferably at least to a major extent, disposed within the housing 72a. FIG. 2 shows the construction of the drive device 10a in a simplified diagram. The drive device 10a has a bidirectional freewheeling assembly 16a. The freewheeling assembly 16a is configured as a force-fit-based freewheeling assembly. The freewheeling assembly 16a is configured so as to be different from a ratchet freewheeling assembly. The freewheeling assembly 16a has at least one clamping element unit 18a. The clamping element unit 18a is configured as a clamping roller unit. Alternatively however, it is also conceivable for the clamping element unit 18a to be configured as a clamping member unit or as a clamping ball unit. The clamping element unit 18a is disposed on the gearbox output of the drive unit 12a. Alternatively, it is also conceivable for the clamping element unit 18a to be disposed at another position within the gearbox 76a.

The drive unit 12a comprises at least one pedal crankshaft 105a. The pedal crankshaft 105a is able to be driven by a user by way of pedals (not illustrated). The output sprocket 108a is connected to the pedal crankshaft 105a in such a manner that the output sprocket 108a is able to be driven by a rotation of the pedal crankshaft 105a, in particular at least in one rotation direction, preferably in the direction of a forward rotation direction 78a of the drive device 10a. The forward rotation direction 78a corresponds to a forward movement of the electric bicycle 14a. It is conceivable for a shaft 50a to be connected to the pedal crankshaft 105a in a rotatably mounted manner. Additionally, it is conceivable for the drive unit 12a to have a further freewheeling assembly (not illustrated here) which is disposed between the shaft 50a and the pedal crankshaft 105a. The further freewheeling assembly is preferably provided to prevent conjoint rotation of the pedal crankshaft 105a in the case of a rotating shaft 50a. Alternatively, it is conceivable for the shaft 50a to be co-rotationally connected to the pedal crankshaft 105a. Alternatively, it is conceivable in particular for the shaft 50a to be configured so as to be integral to the pedal crankshaft 105a. Furthermore alternatively, it is conceivable for the shaft 50a to correspond to the pedal crankshaft 105a.

The drive device 10a comprises at least one force transmission element 42a for transmitting a driving force of the drive unit 12a. The clamping element unit 18a is disposed on the force transmission element 42a. The force transmission element 42a is configured as a spur gear. The spur gear has an external toothing. It is conceivable for the external toothing to be configured as a spur toothing or as a helical toothing. Alternatively however, it is also conceivable for the force transmission element 42a to be configured as a planet gear, as a ring gear, as a sun gear, or as any other force transmission element 42a considered expedient by a person skilled in the art. The force transmission element 42a forms the gearbox output of the drive unit 12a. Alternatively however, it is also conceivable for the force transmission element 42a to be disposed within the gearbox 76a and to be provided in particular for transmitting force to a layshaft of the gearbox 76a.

The drive device 10a comprises at least the shaft 50a. The shaft 50a is configured as an output shaft. Alternatively however, it is also conceivable for the shaft 50a to be configured as a layshaft, which is in particular disposed within the gearbox 76a, or the like. The output sprocket 108a is co-rotationally connected to the shaft 50a. It is conceivable for the output sprocket 108a to be configured so as to be integral to the shaft 50a.

Figure 4:
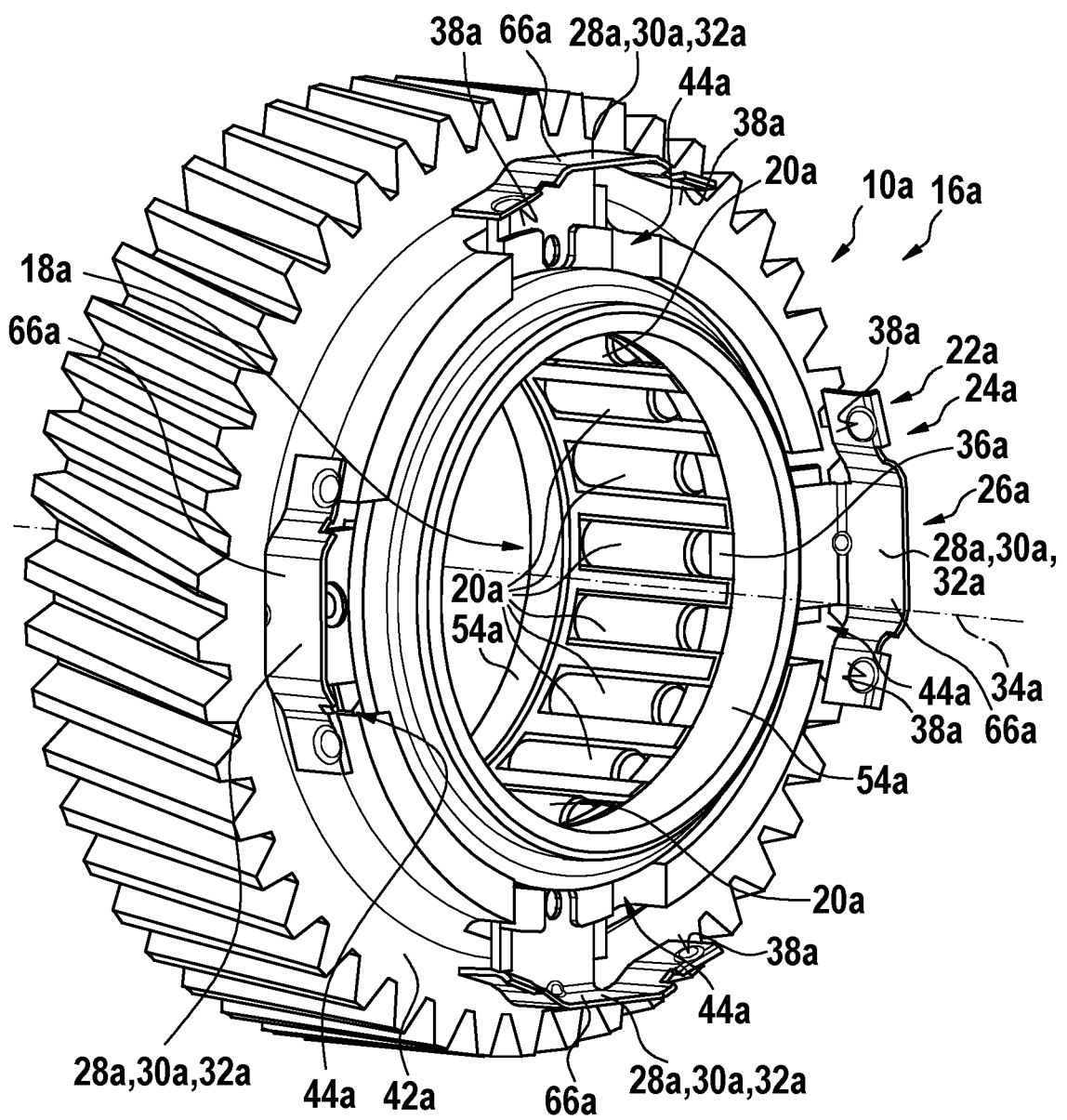
FIG. 4 shows the drive device in a perspective illustration.
Figure 5:
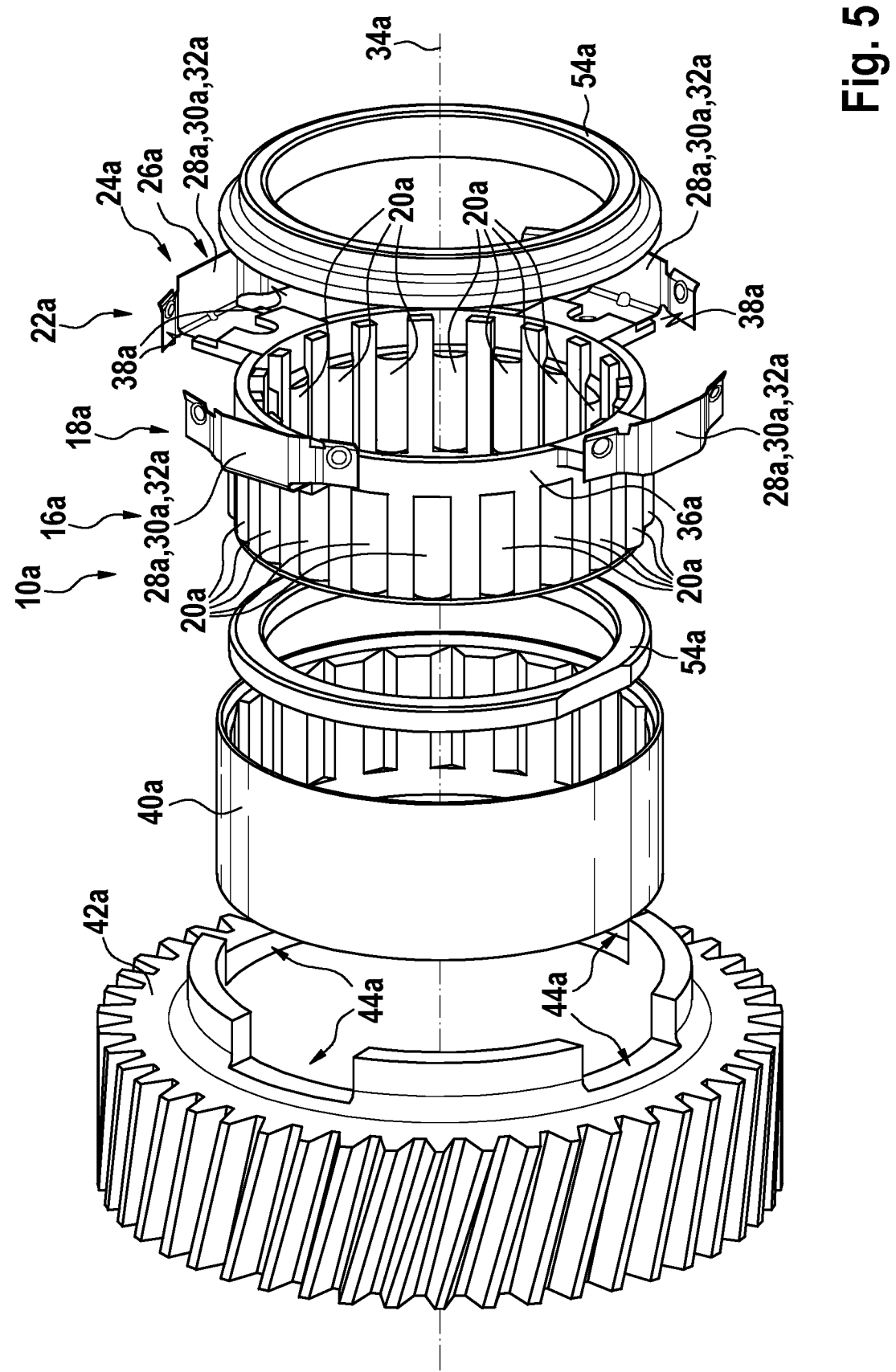
FIG. 5 shows the drive device in an exploded illustration.

The freewheeling assembly 16a has a rotation axis 34a. The shaft 50a and the force transmission element 42a are disposed coaxially about the rotation axis 34a (cf. also FIGS. 3, 4 and 5). The shaft 50a, the pedal crankshaft and/or the force transmission element 42a are/is mounted so as to be rotatable about the rotation axis 34a. A torque on the output sprocket 108a can be generated by rotating the shaft 50a about the rotation axis 34a. The clamping element unit 18a is specified to interrupt a transmission of a motor torque, which in terms of the forward direction of the electric bicycle 14a is directed forwards, to the shaft 50a, in particular the output sprocket 108a, when a rotating speed of the shaft 50a is higher than a rotating speed of the force transmission element 42a driven by the motor torque. The clamping element unit 18a is specified to interrupt a transmission of a motor torque, which in terms of the forward direction of the electric bicycle 14a is directed backwards, to the shaft 50a, in particular the output sprocket 108a, when the rotating speed of the shaft 50a, in particular of the output sprocket 108a, is higher than the rotating speed of the force transmission element 42a driven by the motor torque. The clamping element unit 18a is specified to interrupt a transmission of a torque of the shaft 50a, in particular of the output sprocket 108a, from the shaft 50a, in particular from the output sprocket 108a, to the force transmission element 42a, preferably the gearbox 76a and/or the electric motor 74a, when the shaft 50a, in particular the output sprocket 108a, in terms of the forward rotation direction 78a rotates backwards. The clamping element unit 18a is specified to interrupt the transmission of the torque of the shaft 50a, in particular of the output sprocket 108a, from the shaft 50a, in particular from the output sprocket 108a, to the force transmission element 42a, preferably to the gearbox 76a and/or the electric motor 74a, independently of the rotating speed of the force transmission element 42a and independently of the rotating speed of the shaft 50a, in particular of the output sprocket 108a.

The clamping element unit 18a is provided for decoupling vibrations of a wrapping means 58a. The wrapping means 58a is configured as a chain. Alternatively, it is also conceivable for the wrapping means 58a to be configured as a belt or the like. The wrapping means 58a is preferably co-rotationally connected to the output shaft, in particular the output sprocket 108a. The wrapping means 58a is provided to transmit a driving force from the shaft 50a, in particular from the output sprocket 108a, to a drive wheel 80a of the electric bicycle 14a. The drive wheel 80a is configured as a rear wheel of the electric bicycle 14a. Alternatively however, it is also conceivable for the drive wheel 80a to be configured as a front wheel of the electric bicycle 14a. The clamping element unit 18a is provided to counteract a transmission of vibrations of the wrapping means 58a to components of the drive unit 12a, which proceeding from the wrapping means 58a are disposed behind the clamping element unit 18a in the drivetrain. The clamping element unit 18a is provided to counteract a transmission of vibrations of the wrapping means 58a to the gearbox 76a and/or the electric motor 74a.

The clamping element unit 18a comprises a multiplicity of rolling members 20a (only one rolling member 20a is illustrated in the simplified schematic illustration in FIG. 2). It is also conceivable for the clamping element unit 18a to comprise only one rolling member 20a. The rolling members 20a are configured as rollers. Alternatively, it is also conceivable for the rolling members 20a to be configured as balls, as drums, as needles, as cones, or as other rotation members considered expedient by a person skilled in the art. The rolling members 20a in a clamping position of the rolling members 20a are provided for transmitting torque between the force transmission element 42a and the shaft 50a. The rolling members 20a in a freely rotating position of the rolling members 20a are provided for interrupting a transmission of torque between the force transmission element 42a and the shaft 50a.

The clamping element unit 18a comprises at least one sleeve 40a. The sleeve 40a is disposed on the force transmission element 42a. The sleeve 40a is co-rotationally connected to the force transmission element 42a. It is conceivable for the sleeve 40a to be configured so as to be integral to the force transmission element 42a. It is also conceivable that the sleeve 40a is formed by the force transmission element 42a. The rolling members 20a are disposed between the force transmission element 42a, in particular the sleeve 40a, and the shaft 50a. The rolling members 20a are uniformly disposed. The rolling members 20a are disposed uniformly along a circumferential direction of the shaft 50a, which runs in particular in the plane perpendicular to the rotation axis 34a.

The clamping element unit 18a has at least one clamping face 82a, preferably a multiplicity of clamping faces 82a. The sleeve 40a comprises the at least one clamping face 82a. The clamping face 82a is provided to interact with at least one of the rolling members 20a so as to transmit torque between the force transmission element 42a and the shaft 50a. The clamping element unit 18a has at least one further clamping face 84a. The further clamping face 84a is provided to interact with at least one of the rolling members 20a so as to transmit torque between the force transmission element 42a and the shaft 50a. The shaft 50a has a circular-cylindrical shell face 86a. The further clamping face 84a is formed by the circular-cylindrical shell face 86a of the shaft 50a. The sleeve 40a has an internal face 88a. The internal face 88a faces the shaft 50a. The internal face 88a comprises the at least one clamping face 84. A number of clamping faces 82a corresponds to the number of rolling members 20a. The rolling members 20a are in each case assigned one of the clamping faces 82a.

The rolling members 20a are in each case provided to be clamped by one of the clamping faces 82a and the further clamping faces 84a so as to transmit torque between the force transmission element 42a and the shaft 50a. The sleeve 40a has at least a multiplicity of recesses 90a for disposing the rolling members 20a (only one recess 90a is illustrated in the simplified schematic illustration in FIG. 2). A number of recesses 90a corresponds to a number of rolling members 20a. One of the clamping faces 82a is in each case disposed in the recesses 90a. The recesses 90a are configured so as to be asymmetrical, in particular at least when viewed in a circumferential direction of the force transmission element 42a, which preferably lies in a plane which runs perpendicularly to the rotation axis 34a. The recesses 90a are configured in such a manner that the rolling members 20a can in each case be disposed in the recesses 90a in a clamping position on the clamping face 82a and in a freely rotating position.

The clamping element unit 18a comprises at least one clamping element holding member 36a (the clamping element holding member 36a is illustrated in a schematically simplified manner in FIG. 2). The clamping element holding member 36a has a multiplicity of receptacle regions 92a for the rolling members 20a. The clamping element holding member 36a is configured so as to be annular (cf. also FIGS. 4 and 5). The clamping element holding member 36a is configured as a cage ring. A number of receptacle regions 92a corresponds to the number of rolling members 20a. The receptacle regions 92a are separate from one another. The receptacle regions 92a delimit a movement of the rolling members 20a, in particular about the rotation axis 34a, preferably in the circumferential direction, relative to the clamping element holding member 36a. The clamping element holding member 36a is disposed between the shaft 50a and the force transmission element 42a, in particular the sleeve 40a. The clamping element holding member 36a is disposed so as to be movable relative to the force transmission element 42a, in particular the sleeve 40a, and/or the shaft 50a. The clamping element holding member 36a is provided to guide the rolling members 20a.

The clamping element unit 18a comprises a mechanical control unit 22a. The control unit 22a is provided to change between a freewheeling state and a torque-transmitting state of the freewheeling assembly 16a. The freewheeling state is a state of the freewheeling assembly 16a in which a transmission of torque between the force transmission element 42a and the shaft 50a is interrupted. The torque-transmitting state is a state of the freewheeling assembly 16a in which a transmission of torque between the force transmission element 42a and the shaft 50a takes place. A changeover between the freewheeling state and the torque-transmitting state by means of the control unit 22a takes place automatically, in particular so as to be free of any intervention by a user and/or free of electronic control. The control unit 22a is free of electrical components. Alternatively however, it is also conceivable for the clamping element unit 18a to comprise an electronic control unit.

The control unit 22a has a friction unit 24a which is provided for generating an actuating force. The friction unit 24a is provided for moving the clamping element holding member 36a relative to the force transmission element 42a and/or the shaft 50a, in particular for rotating said clamping element holding member about the rotation axis 34a. The friction unit 24a is at least provided for releasing a torque-transmitting state of the freewheeling assembly 16a, as a function of a relative movement of the force transmission element 42a to the shaft 50a. The friction unit 24a, as a function of a relative movement of the force transmission element 42a to the shaft 50a, is at least provided to switch the freewheeling assembly 16a by the actuating force from the torque-transmitting state of the freewheeling assembly 16a to the freewheeling state of the freewheeling assembly 16a. The friction unit 24a is provided to position the rolling members 20a relative to the force transmission element 42a, in particular the sleeve 40a, and/or the shaft 50a, preferably so as to switch the freewheeling assembly 16a, preferably at least from the torque-transmitting state to the freewheeling state.

The friction unit 24a is provided to generate a frictional force between the clamping element holding member 36a and a friction member 94a which is configured separately from the clamping element holding member 36a. The friction member 94a is a stationary component of the freewheeling assembly 16a. The friction member 94a is configured as a friction ring. The friction member 94a is co-rotationally connected to a housing component 62a of the housing 72a. Alternatively, it is also conceivable for the friction member 94a to be formed by a stationary component of the electric bicycle 14a, in particular of the drive unit 12a. Alternatively, the friction member 94a is configured, for example, by the housing component 62a, by a frame element of the frame 68a, or the like. Frictional contact between the clamping element holding member 36a and the friction member 94a is formed by the friction unit 24a. The friction unit 24a has a multiplicity of friction elements 66a (only two friction elements 66a are illustrated in the simplified schematic illustration in FIG. 2). The friction unit 24a has four friction elements 66a. Alternatively, it is also conceivable for the friction unit 24a to have a number of friction elements 66a which differs from four, for example one friction element 66a, two friction elements 66a, three friction elements 66a, or more than four friction elements 66a. The friction elements 66a are provided for forming the frictional contact between the clamping element holding member 36a and the friction member 94a. The friction elements 66a are disposed in the circumferential direction of the clamping element holding member 36a, which runs in particular in a plane perpendicular to the rotation axis 34a.

The friction elements 66a have in each case two friction faces 38a for forming the frictional contact between the clamping element holding member 36a and the friction member 94a. Alternatively, it is also conceivable for the friction elements 66a to have in each case only one friction face 38a or more than two friction faces 38a. Alternatively however, it is also conceivable for the friction elements 66a to be disposed non-uniformly in the circumferential direction, preferably on the clamping element holding member 36a or the friction member 94a. The friction elements 66a are fastened to the clamping element holding member 36a. The friction elements 66a are configured so as to be integral to the clamping element holding member 36a.

The actuating force is a frictional force. The friction unit 24a, in at least one operating state of the freewheeling assembly 16a, is provided to generate the actuating force by static friction and/or dynamic friction between the clamping element holding member 36a and the friction member 94a. The actuating force, in particular the frictional force, at least in the operating state of the freewheeling assembly 16a, acts counter to a torque prevailing on the clamping element holding member 36a. The actuating force, preferably the frictional force, is provided to decelerate a rotation of the clamping element holding member 36a about the rotation axis 34a relative to the shaft 50a, in particular at least in the freewheeling state.

The drive device 10a comprises at least one bearing unit 96a which is at least partially disposed between the force transmission element 42a, in particular the sleeve 40a, and the shaft 50a. The bearing unit 96a is at least provided to mount the force transmission element 42a and the shaft 50a so as to be mutually rotatable and/or at a fixed radial spacing relative to one another. The bearing unit 96a comprises at least two bearing elements 54a. Alternatively, it is also conceivable for the bearing unit 96a to comprise only one bearing element 54a or more than two bearing elements 54a. The bearing elements 54a are configured as plain bearing rings. The bearing elements 54a are disposed between the force transmission element 42a, in particular the sleeve 40a, and the shaft 50a.

The clamping element unit 18*a*, by means of the respective clamping face 82*a*, is specified to clamp the rolling members 20*a* in the recesses 90*a* when the rotating speed of the force transmission element 42*a* in the forward rotation direction 78*a* is higher than or is equal to the rotating speed of the shaft 50*a*. The friction unit 24*a*, during a rotation of the force transmission element 42*a* in the forward rotation direction 78*a*, wherein a rotating speed of the force transmission element 42*a* is higher than a rotating speed of the shaft 50*a*, by means of the actuating force, in particular the frictional force, is provided to brake the clamping element holding member 36*a* relative to the force transmission element 42*a*, so as to bring into contact the rolling members 20*a* with the clamping faces 82*a* in the recesses 90*a* of the sleeve 40*a*, and to clamp said rolling members 20*a*. The clamping element unit 18*a*, by way of the actuating force, in particular the frictional force, in a rotation direction of the shaft 50*a* which in terms of the forward rotation direction 78*a* is directed backwards, is provided to generate a force on the rolling members 20*a* so as to release the rolling members 20*a* from the clamping faces 82*a* such that the freewheeling assembly 16*a* is switched to the freewheeling state. Clamping of the rolling members 20*a* by way of the force transmission element 42*a*, in particular the sleeve 40*a*, and the shaft 50*a* can be generated by the actuating force, in particular the frictional force, when the rotating speed of the force transmission element 42*a* is higher than the rotating speed of the shaft 50*a*, preferably at least in a rotation of the force transmission element 42*a* which in terms of the forward rotation direction 78*a* is directed forwards. As a result of the clamping of the rolling members 20*a* by way of the force transmission element 42*a*, in particular the sleeve 40*a*, and the shaft 50*a*, a torque is able to be transmitted between the force transmission element 42*a* and the shaft 50*a*.

The rolling members 20*a* in the torque-transmitting state are co-rotationally connected to the force transmission element 42*a*, in particular the sleeve 40*a*, and the shaft 50*a*. The rolling members 20*a* are in particular in the clamping position when the freewheeling assembly 16*a* is in the torque-transmitting state. The rolling members 20*a* in the freewheeling state are disposed so as to rotate freely in the recesses 90*a*. The rolling members 20*a* are in particular in the freely rotating position when the freewheeling assembly 16*a* is in the freewheeling state. The rolling members 20*a* are in each case disposed so as to freely rotate in the recesses 90*a* when the shaft 50*a* in terms of the forward rotation direction 78*a* rotates backwards. The rolling members 20*a* are in each case disposed so as to freely rotate in the recesses 90*a* when the shaft 50*a* in terms of the forward rotation direction 78*a* rotates forwards and the rotating speed of the shaft 50*a* is higher than the rotating speed of the force transmission element 42*a*. The rolling members 20*a* are in each case disposed so as to freely rotate in the recesses 90*a* when the force transmission element 42*a* in terms of the forward rotation direction 78*a* rotates backwards. The clamping element unit 18*a*, by means of the clamping element holding member 36*a*, is provided to release the rolling members 20*a* from the clamping action when the rotating speed of the shaft 50*a* is higher than the rotating speed of the force transmission element 42*a*.

Figure 6:
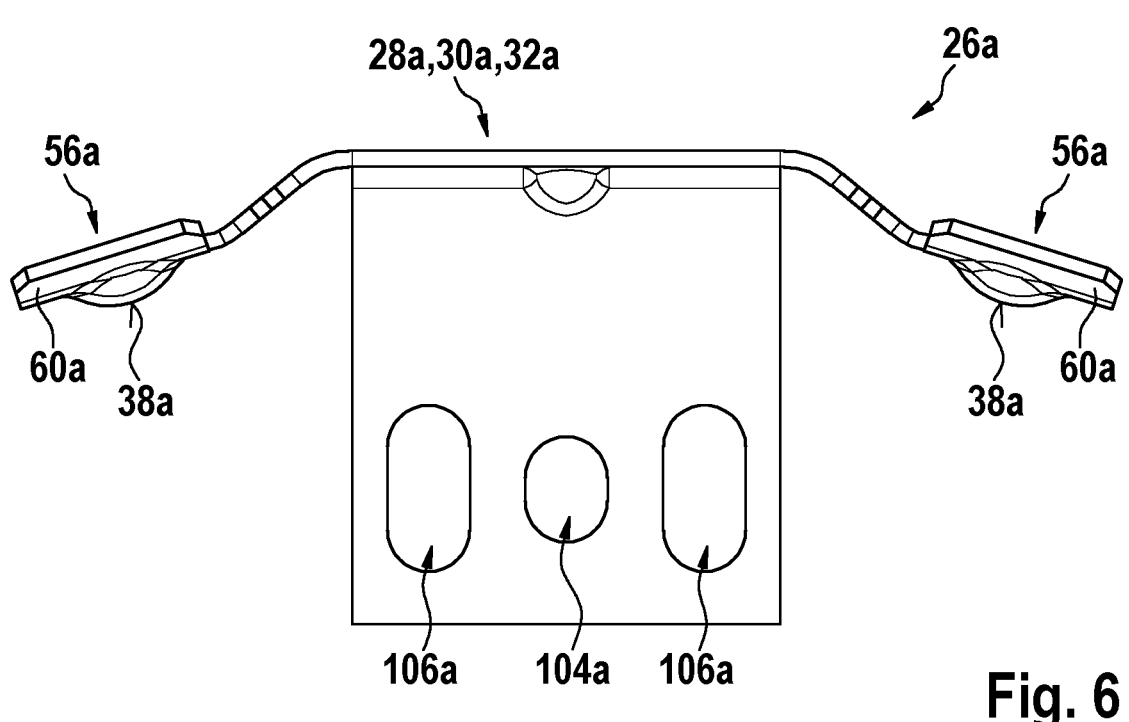
FIG. 6 shows a spring element of the drive device.

The friction unit 24*a* comprises at least one spring unit 26*a*. The clamping element holding member 36*a* is connected to the friction member 94*a* by way of the spring unit 26*a*. The spring unit 26*a* is provided to generate a holding force between the clamping element holding member 36*a* and the friction member 94*a*. The spring unit 26*a* is provided to generate the actuating force, in particular the frictional force, of the friction unit 24*a*. The spring unit 26*a* has four spring elements 32*a*. Alternatively however, it is also conceivable for the spring unit 26*a* to have a number of spring elements 32*a* which differs from four, for example only one spring element 32*a*, two spring elements 32*a*, three spring elements 32*a*, or more than four spring elements 32*a*. The friction elements 66*a* are formed by the spring elements 32*a*. The spring elements 32*a* are configured as flexible springs 28*a*. Alternatively, it is also conceivable for the spring elements 32*a* to be configured as torsion springs, as plate springs, as volute springs, as annular springs, or the like. Furthermore alternatively, it is also conceivable for the spring elements 32*a* to be configured as rubber-elastic elements. The spring elements 32*a* are disposed on the clamping element holding member 36*a*. The spring elements 32*a* are disposed between the clamping element holding member 36*a* and the friction member 94*a*. The clamping element holding member 36*a* is connected to the friction member 94*a* by way of the spring elements 32*a*. The four spring elements 32*a* have in each case two assembly ramps 60*a* (cf. FIG. 6). The assembly ramps 60*a* are formed by faces which are angled in relation to the rotation axis 34*a* and run preferably in a manner other than perpendicular.

The flexible springs 28*a* are configured as leaf springs 30*a*. Alternatively, it is also conceivable for the flexible springs 28*a* to be configured as wire springs, as needle springs, as leg springs, or the like. The spring unit 26*a* is preferably configured so as to be free of coil springs. The leaf springs 30*a* are configured as leaf springs having at least two arms. Alternatively however, it is also conceivable for the leaf springs 30*a* to be configured as single-arm leaf springs, as spiral springs, as cushioning springs, as elliptic springs, as parabolic springs, as serpentine springs, or as other leaf springs 30*a* considered expedient by a person skilled in the art. The leaf springs 30*a* have in each case two spring arms 56*a* (cf. FIG. 6). The friction faces 38*a* of the friction elements 66*a* are in each case disposed on the spring arms 56*a*.

The rolling members 20*a* are disposed without springs on the clamping element holding member 36*a*. The receptacle regions 92*a* for the rolling members 20*a* are free of spring elements. In particular, a region between the rolling members 20*a* and the clamping element holding member 36*a*, preferably at least in the respective receptacle region 92*a*, is free of spring elements. The rolling members 20*a* are free of any mounting on the clamping element holding member 36*a* by means of spring elements.

The spring elements 32*a* are fastened to the clamping element holding member 36*a*. The spring elements 32*a* are formed from a material which differs from a material from which the clamping element holding member 36*a* is formed. The spring elements 32*a* are formed from metal. Alternatively however, it is also conceivable for the spring elements 32*a* to be formed from a plastics material or any other material considered expedient by a person skilled in the art. The clamping element holding member 36*a* is formed from a plastics material. Alternatively however, it is also conceivable for the clamping element holding member 36*a* to be formed from a metal or any other material considered expedient by a person skilled in the art. Alternatively however, it is also conceivable for the spring elements 32*a* and the clamping element holding member 36*a* to be configured from an identical material. The spring elements 32*a* are configured so as to be integral to the clamping element holding member 36*a*. The spring elements 32*a* are over-moulded by the clamping element holding member 36*a*. The spring elements 32a are at least partially overmoulded by the clamping element holding member 36a.

The spring elements 32a have in each case two connection elements 106a so as to connect the spring elements 32a to the clamping element holding member 36a. The connection elements 106a are configured as openings. Alternatively however, it is also conceivable for the connection elements 106a to be configured as other connection elements 106a considered expedient by a person skilled in the art. The connection elements 106a are provided to be penetrated by the clamping element holding member 36a by injection moulding in the case of production of the clamping element unit 18a. The spring elements 32a have in each case one assembly element 104a. The respective assembly element 104a is provided to support an arrangement of the spring elements 32a on the clamping element holding member 36a in an assembly position prior to overmoulding. The assembly elements 104a are configured as openings. Alternatively however, it is also conceivable for the assembly elements 104a to be configured as protrusions or as other assembly elements 104a considered expedient by a person skilled in the art.

The friction faces 38a of the friction unit 24a, in particular of the friction elements 66a, extend in the axial direction. The axial direction runs parallel to the rotation axis 34a. The friction faces 38a are at least partially curved. Alternatively or additionally, it is conceivable for the friction faces 38a to at least partially run in a rectilinear manner. The friction faces 38a have in each case a plane of main extent which runs so as to be at least substantially parallel to the axial direction.

When viewed in the axial direction, the friction faces 38a which extend in the axial direction are disposed on a side that faces away from the clamping element holding member 36a. The spring arms 56a of the spring elements 32a are disposed on the side that faces away from the clamping element holding member 36a, in particular at least when viewed in the axial direction. When viewed in the radial direction, the friction faces 38a which extend in the axial direction are oriented inwards. The friction faces 38a are disposed so as to face the shaft 50a. The friction faces 38a are disposed so as to face the rotation axis 34a.

The force transmission element 42a has four lead throughs 44a by way of which the clamping element holding member 36a in the radial direction is at least partially guided towards the outside. Alternatively, it is also conceivable for the force transmission element 42a to have a number of lead throughs 44a which differs from four, for example only one lead through 44a, two, three, or more than four lead throughs 44a. A number of lead throughs 44a corresponds in particular to a number of friction elements 66a, in particular spring elements 32a. Alternatively however, it is also conceivable for the number of lead throughs 44a to differ from a number of friction elements 66a, in particular spring elements 32a.

A value of a maximum diameter 46a of the rolling members 20a is between 6% and 20% of a value of a maximum internal diameter 48a of the force transmission element 42a, in particular the sleeve 40a. A value of the maximum diameter 46a of the rolling members 20a preferably is at most 15%, particularly preferably at most 10%, of a value of the maximum internal diameter 48a of the force transmission element 42a, in particular the sleeve 40a. Alternatively however, it is also conceivable that a value of the maximum diameter 46a of the rolling members 20a is outside a range between 6% and 20% of a value of the maximum internal diameter 48a of the force transmission element 42a, in particular the sleeve 40a.

The internal diameter 48a is in particular measured in the radial direction. The maximum diameter 46a is preferably measured in the radial direction. A value of the maximum diameter 46a of the rolling members 20a is between 8% and 25% of a value of a maximum diameter 52a of the shaft 50a. A value of the maximum diameter 46a of the rolling members 20a is preferably at most 15%, particularly preferably at most 12%, of a value of the maximum diameter 52a of the shaft 50a. Alternatively however, it is also conceivable for a value of the maximum diameter 46a of the rolling members 20a to be outside a range between 8% and 25% of a value of the maximum diameter 52a of the shaft 50a. The maximum diameter 52a of the shaft 50a is in particular measured in the radial direction.

A value of the maximum diameter 52a of the shaft 50a is, for example, at most 38 mm; a value of the maximum diameter 52a of the shaft 50a is particularly preferably 32 mm. A value of the maximum internal diameter 48a of the force transmission element 42a, in particular of the sleeve 40a, is at most 45 mm. A value of the maximum internal diameter 48a of the force transmission element 42a, in particular of the sleeve 40a, is preferably between 40 mm and 41 mm. Alternatively however, it is also conceivable for a value of the maximum internal diameter 48a of the force transmission element 42a, in particular of the sleeve 40a, to be more than 45 mm. A value of the maximum diameter 46a of the rolling members 20a is at most 5 mm. A value of the maximum diameter 46a of the rolling members 20a is preferably substantially 3.5 mm. Alternatively however, it is also conceivable for a value of the maximum diameter 46a of the rolling members 20a to be more than 5 mm.

A respective maximum motion angle, in particular a translatory angle, of the rolling members 20a relative to the clamping element holding member 36a about the rotation axis 34a of the freewheeling assembly 16a is at most 1.5°. The maximum motion angle, in particular translatory angle, of the rolling members 20a relative to the clamping element holding member 36a is preferably between 0° and 1°. The respective maximum motion angle, in particular translatory angle, of the rolling members 20a relative to the clamping element holding member 36a is particularly preferably substantially 0.5°. Alternatively however, it is also conceivable for the respective maximum motion angle, in particular translatory angle, of the rolling members 20a relative to the clamping element holding member 36a about the rotation axis 34a to be more than 1.5°.

A maximum angle between the respective clamping position of the rolling members 20a and a respective maximum freely rotating position of the rolling members 20a about the rotation axis 34a of the freewheeling assembly 16a is at most 5°. The maximum angle between the respective clamping position of the rolling members 20a and the respective maximum freely rotating position of the rolling members 20a about the rotation axis 34a of the freewheeling assembly 16a is preferably at most 2.5°. The maximum angle between the respective clamping position of the rolling members 20a and the respective maximum freely rotating position of the rolling members 20a about the rotation axis 34a of the freewheeling assembly 16a is preferably between 0.3° and 2.5°, particularly preferably between 0.4° and 2°. The maximum angle between the respective clamping position of the rolling members 20a and the respective maximum freely rotating position of the rolling members 20a about the rotation axis 34a is most particularly preferably at least substantially 0.8°. The respective maximum freely rotating position and the respective clamping position of the rolling members 20a are in each case located in one of the recesses 90*a* for the rolling members 20*a*. The respective maximum freely rotating position and the clamping position are located at mutually opposite end regions of the recesses 90*a*. The clamping faces 82*a* are in each case disposed on a rear side of the recesses 90*a* in terms of the forward rotation direction 78*a*. The respective freely rotating position is disposed on a front side of the recesses 90*a* in terms of the forward rotation direction 78*a*. The recesses 90*a*, in the respective end region in which the freely rotating position of the respective rolling member 20*a* is in particular located, have a detent for the respective rolling member 20*a*. Alternatively, it is also conceivable for the maximum angle between the respective clamping position and the respective maximum freely rotating position of the rolling members 20*a* about the rotation axis 34*a* of the freewheeling assembly 16*a* to be more than 5°. The rolling members 20*a* are in each case in the maximum freely rotating position when the rolling members 20*a* bear on the respective detent of the recesses 90*a*.

The clamping element unit 18*a* and the force transmission element 42*a* have a common section plane which runs so as to be at least substantially perpendicular to the rotation axis 34*a*. The clamping element unit 18*a* is disposed so as to be at least substantially completely within the force transmission element 42*a*. Alternatively, it is also conceivable for the clamping element unit 18*a* to be disposed offset in relation to the force transmission element 42*a* in the axial direction in such a manner that at least the external toothing of the force transmission element 42*a* and the clamping element unit 18*a* are free of a common section plane which runs so as to be at least substantially perpendicular to the rotation axis 34*a*.

A sum of a cage angle and a spring angle is smaller than a sleeve clearance angle or equal to the sleeve clearance angle. The clamping element holding member angle is formed by a sum of a clamping element holding member clearance angle and a clamping element holding member load angle. The clamping element holding member angle is at most 2.5°. The clamping element holding member angle is particularly preferably substantially 1.8°. Alternatively however, it is also conceivable for the clamping element holding member angle to be more than 2.5°. The clamping element holding member clearance angle corresponds to the respective maximum motion angle, in particular translatory angle, of the rolling members 20*a* relative to the clamping element holding member 36*a* about the rotation axis 34*a* of the freewheeling assembly 16*a*. The clamping element holding member load angle is a sum of a mechanical clamping element holding member load angle and a chemical and/or thermal clamping element holding member load angle. The clamping element holding member load angle is at most 1°. The clamping element holding member load angle is particularly preferably substantially 0.8°. Alternatively however, it is also conceivable for the clamping element holding member load angle to be more than 1°. The mechanical clamping element holding member load angle is in particular a function of potential mechanical deformations in terms of the clamping element holding member 36*a* in the operation of the clamping element unit 18*a*. The mechanical clamping element holding member load angle is at most 0.7°. The mechanical clamping element holding member load angle is particularly preferably substantially 0.5°. Alternatively however, it is also conceivable for a value of the mechanical clamping element holding member load angle to be more than 0.7°. The chemical and/or thermal clamping element holding member load angle is in particular a function of the clamping element holding member 36*a* in terms of a potential thermal expansion, a potential swelling of the material, for example as a result of absorbing moisture, or the like. The chemical and/or thermal clamping element holding member load angle is at most 0.5°. The chemical and/or thermal clamping element holding member load angle is particularly preferably substantially 0.3°. Alternatively however, it is also conceivable for a value of the chemical and/or thermal clamping element holding member load angle to be more than 0.5°.

The sleeve clearance angle preferably corresponds to the respective maximum angle between the respective clamping position of the rolling members 20*a* and the respective maximum freely rotating position of the rolling members 20*a*. A sum of the sleeve clearance angle and a sleeve load angle results in particular in a sleeve angle. The sleeve angle is at most 6.5°, preferably at most 3.5°. The sleeve angle particularly preferably is substantially 3.3°. Alternatively however, it is also conceivable for the sleeve angle to be more than 6.5°. The sleeve load angle is preferably at least a function of a potential deformation and/or expansion of the force transmission element 42*a*, in particular the sleeve 40*a*, preferably the clamping faces 82*a*, in the operation of the clamping element unit 18*a*. The sleeve load angle is at most 4°, preferably at most 2°. The sleeve load angle is very particularly preferably at least substantially 2.5°. Alternatively however, it is also conceivable for the sleeve load angle to have a value which is more than 4°. The spring angle is in particular a sum of a spring clearance angle and a spring load angle. The spring angle is at most 0.1°. The spring angle is particularly preferably substantially 0.05°. Alternatively however, it is also conceivable for the spring angle to be more than 0.1°. The spring clearance angle relates in particular to potential play in the connection between the clamping element holding member 36*a* and the spring unit 26*a*, in particular the spring elements 32*a*. The spring load angle is in particular a function of potential bending of the respective spring elements 32*a*. The spring load angle is preferably at most 0.1°. The spring load angle is particularly preferably substantially 0.05°. Alternatively however, it is also conceivable for the spring load angle to be more than 1°. A freewheeling function angle is in particular a sum of the sleeve angle, the clamping element holding member angle and the spring angle.

Further exemplary embodiments of the disclosure are shown in FIGS. 7 to 14. The descriptions hereunder and the drawings are substantially limited to the points of differentiation between the exemplary embodiments, wherein reference in terms of identically denoted components, in particular in terms of components with identical reference signs, can in principle also be made to the drawings and/or the description of the other exemplary embodiments, in particular of FIGS. 1 to 6. In order for the exemplary embodiments to be differentiated, the suffix a is added to the reference signs of the exemplary embodiment in FIGS. 1 to 6. In the exemplary embodiments of FIGS. 7 to 14, the suffix a is replaced by the letters b to h.

Figure 7:
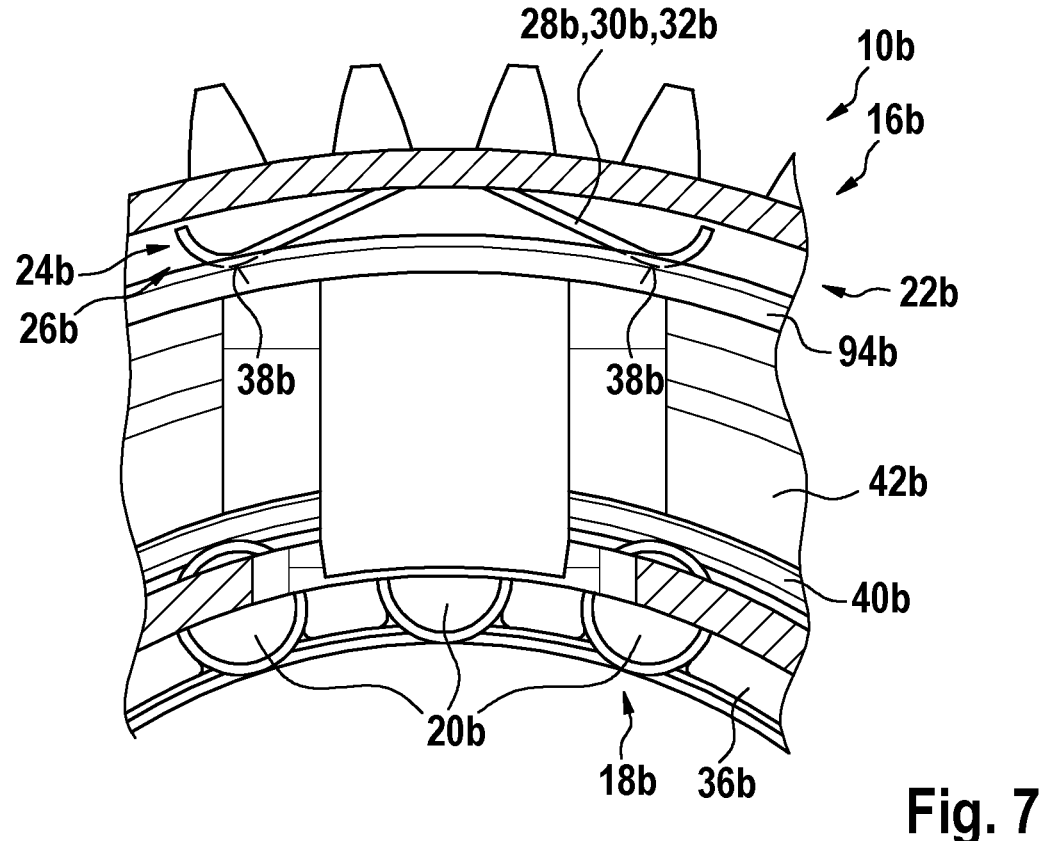
FIG. 7 shows a fragment of a drive device according to the disclosure of a first alternative embodiment in a schematic illustration.

FIG. 7 shows a drive device 10*b* for a drive unit (not illustrated here) of an electric bicycle (not illustrated here). The drive device 10*b* has a bidirectional freewheeling assembly 16*b*. The freewheeling assembly 16*b* has at least one clamping element unit 18*b*. The clamping element unit 18*b* comprises at least one mechanical control unit 22*b*. The control unit 22*b* has at least one friction unit 24*b* which is provided to generate an actuating force. The friction unit 24*b* has at least one spring unit 26*b*. The freewheeling assembly 16*b* has at least one friction member 94*b*. The drive device 10*b* comprises at least one force transmission element 42*b* for transmitting a driving force of the drive unit.

The spring unit 26*b* has four spring elements 32*b* which are configured separately from a clamping element holding member 36*b* of the clamping element unit 18*b* (only one of the four spring elements 32*b* is illustrated in FIG. 7). The spring elements 32*b* are disposed between the friction member 94*b* and the clamping element holding member 36*b*. The spring elements 32*b* are braced between the friction member 94*b* and the clamping element holding member 36*b*. The spring elements 32*b* are able to be flexibly disposed along a circumferential direction of the friction member 94*b* and/or of the clamping element holding member 36*b* between the clamping element holding member 36*b* and the friction member 94*b*, and are in particular able to be clamped for fixing. Alternatively, it is also conceivable for the spring elements 32*b* to be fastened to the clamping element holding member 36*b* or to be fastened to the friction member 94*b*, in particular to be configured so as to be integral to the friction member 94*b*. The spring elements 32*b* are configured as flexible springs 28*b*, in particular as leaf springs 30*b*. The friction unit 24*b* has friction faces 38*b*. The friction faces 38*b* are disposed on the spring elements 32*b*. The friction faces 38*b* are oriented radially inwards. The spring elements 32*b* are in particular formed from a material which is different from a material from which the clamping element holding member 36*b* is configured. Alternatively however, it is also conceivable for the material from which the spring elements 32*b* are formed to correspond to the material from which the clamping element holding member 36*b* is formed. The clamping element unit 18*b* comprises at least one sleeve 40*b*. The clamping element unit 18*b* comprises a multiplicity of rolling members 20*b*.

Figure 8:
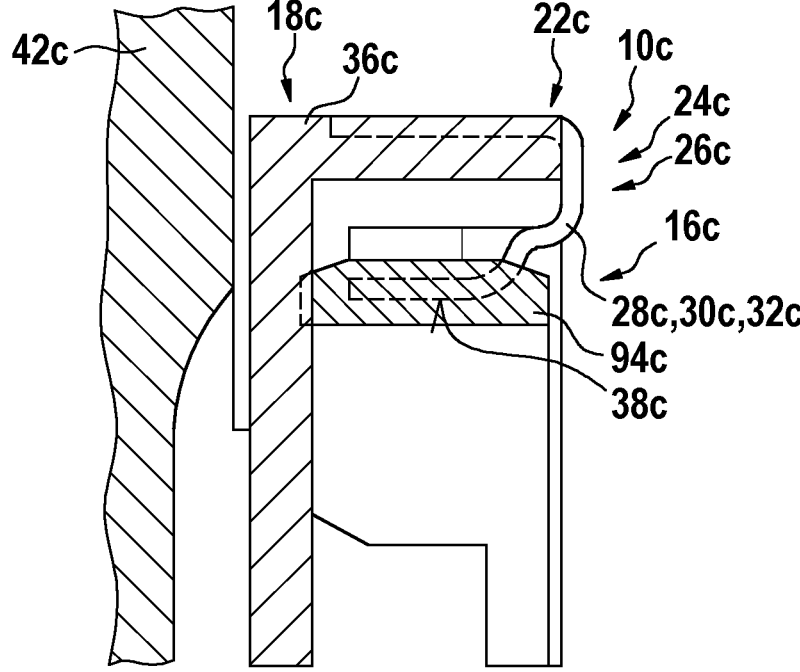
FIG. 8 shows a fragment of a drive device according to the disclosure of a second alternative embodiment in a schematic sectional illustration.

FIG. 8 shows a drive device 10*c* for a drive unit (not illustrated here) of an electric bicycle (not illustrated here). The drive device 10*c* has a bidirectional freewheeling assembly 16*c*. The freewheeling assembly 16*c* has at least one clamping element unit 18*c*. The clamping element unit 18*c* comprises at least one mechanical control unit 22*c*. The control unit 22*c* has at least one friction unit 24*c* which is provided to generate an actuating force. The friction unit 24*c* has at least one spring unit 26*c*. The freewheeling assembly 16*c* has at least one friction member 94*c*. The drive device 10*c* comprises at least one force transmission element 42*c* for transmitting a driving force of the drive unit. The spring unit 26*c* has four spring elements 32*c*. The spring elements 32*c* are configured separately from a clamping element holding member 36*c* of the clamping element unit 18*c*. The spring elements 32*c* are configured as flexible springs 28*c*, in particular as leaf springs 30*c*. The friction member 94*c* in the radial direction is externally surrounded by the clamping element holding member 36*c*. Friction faces 38*c* of the friction unit 24*c* point radially inwards.

Figure 9:
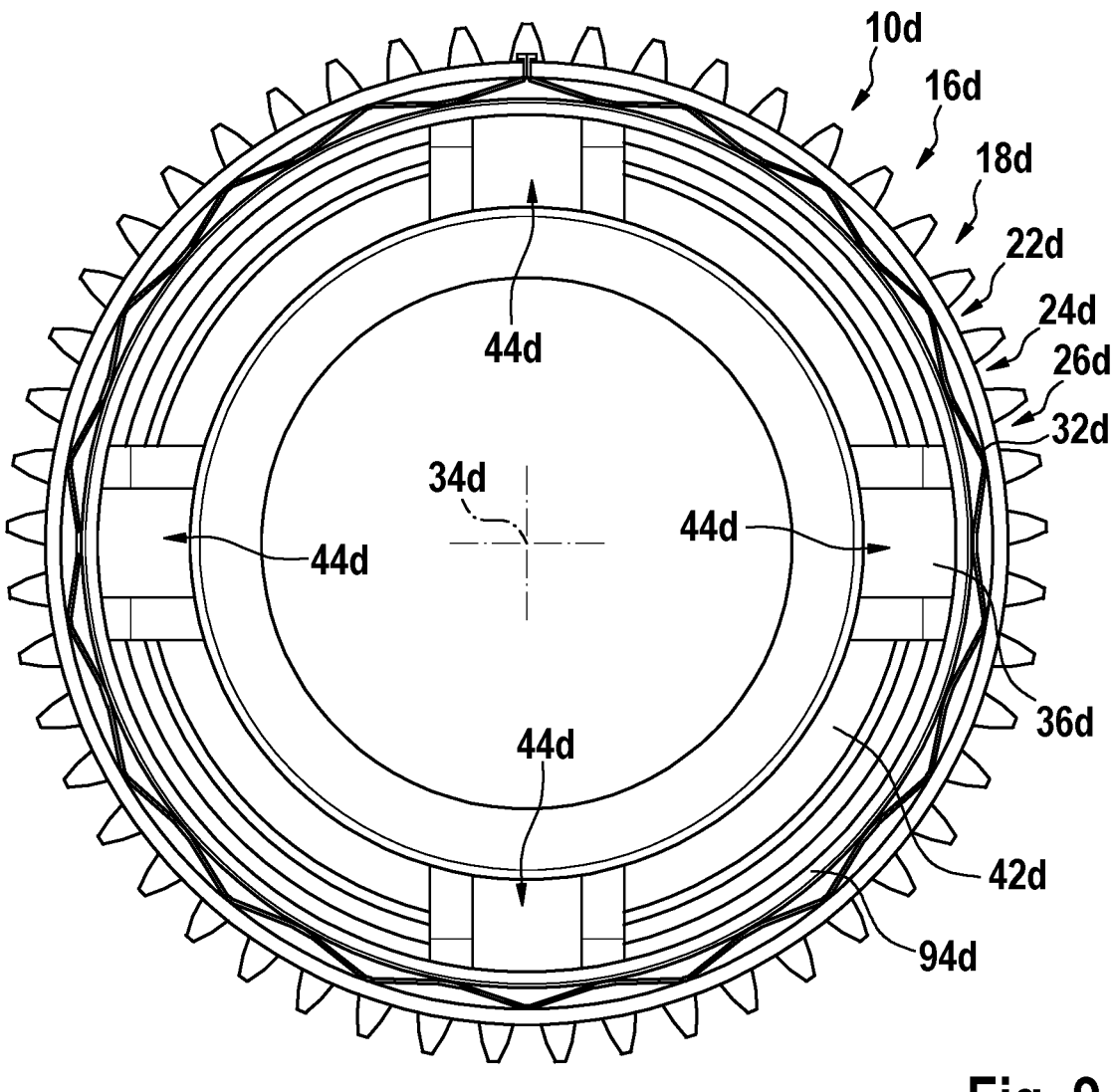
FIG. 9 shows a drive device according to the disclosure of a third alternative embodiment in a schematic illustration.

FIG. 9 shows a drive device 10*d* for a drive unit (not illustrated here) of an electric bicycle (not illustrated here). The drive device 10*d* has a bidirectional freewheeling assembly 16*d*. The freewheeling assembly 16*d* has at least one clamping element unit 18*d*. The clamping element unit 18*d* comprises at least one clamping element holding member 36*d*. The freewheeling assembly 16*d* has at least one friction member 94*d*. The drive device 10*d* comprises at least one force transmission element 42*d* for transmitting a driving force of the drive unit. The force transmission element 42*d* has four lead throughs 44*d* by way of which the clamping element holding member 36*d* in the radial direction is at least partially guided towards the outside.

The clamping element unit 18*d* comprises at least one mechanical control unit 22*d*. The control unit 22*d* has at least one friction unit 24*d* which is provided to generate an actuating force. The friction unit 24*d* has at least one spring unit 26*d*. The spring unit 26*d* comprises a spring element 32*d*. The spring element 32*d* surrounds a rotation axis 34*d* of the freewheeling assembly 16*d* at least to a major extent. The spring element 32*d* is configured so as to be annular. The spring element 32*d* along the main extent thereof has portions 98*d* which are angled in relation to one another and run in a rectilinear manner (by way of example, only three of the portions 98*d* are provided with reference signs in FIG. 9).

Alternatively or additionally, it is also conceivable for the spring element 32*d* along the main extent thereof to run so as to be at least partially curved. The spring element 32*d*, the clamping element holding member 36*d*, the force transmission element 42*d* and the friction member 94*d* are disposed so as to be coaxial with the rotation axis 34*d*.

Figure 10:
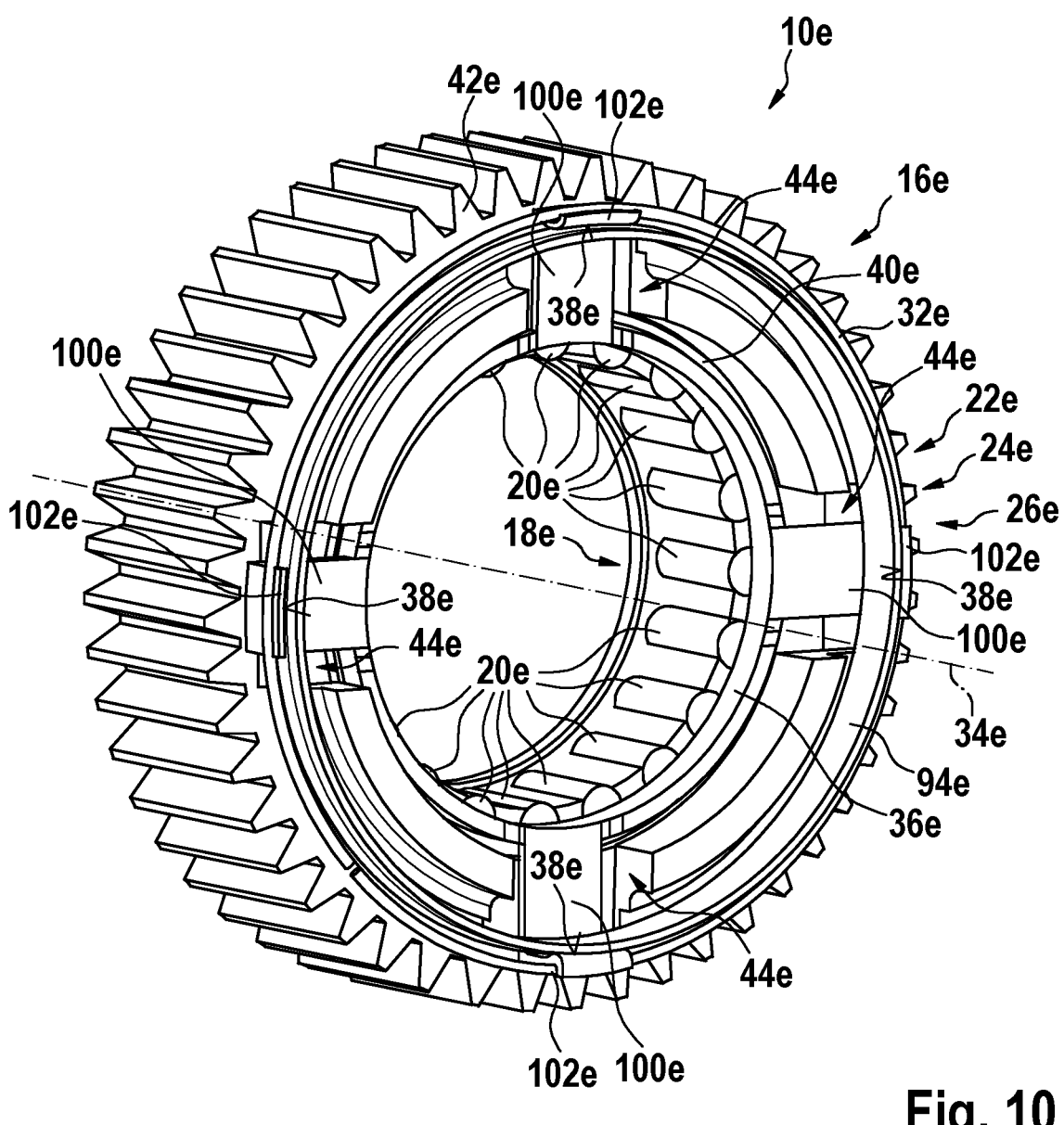
FIG. 10 shows a drive device according to the disclosure of a fourth alternative embodiment in a perspective illustration.

FIG. 10 shows a drive device 10*e* for a drive unit (not illustrated here) of an electric bicycle (not illustrated here). The drive device 10*e* has a bidirectional freewheeling assembly 16*e*. The freewheeling assembly 16*e* has at least one clamping element unit 18*e*. The clamping element unit 18*e* comprises at least one clamping element holding member 36*e*. The freewheeling assembly 16*e* has at least one friction member 94*e*. The drive device 10*e* comprises at least one force transmission element 42*e* for transmitting a driving force of the drive unit. The force transmission element 42*e* has four lead throughs 44*e* by way of which the clamping element holding member 36*e* in the radial direction is at least partially guided towards the outside. The clamping element unit 18*e* comprises at least one sleeve 40*e*.

The clamping element unit 18*e* comprises at least one mechanical control unit 22*e*. The control unit 22*e* has at least one friction unit 24*e* which is provided to generate an actuating force. The friction unit 24*e* has at least one spring unit 26*e*. The spring unit 26*e* comprises a spring element 32*e*. The spring element 32*e* surrounds a rotation axis 34*e* of the freewheeling assembly 16*e* at least to a major extent. The spring element 32*e* is configured so as to be annular. The spring element 32*e* along the main extent thereof has an, in particular continuous, curved profile. Friction faces 38*e* of the friction unit 24*e* are formed by the clamping element holding member 36*e*. The clamping element holding member 36*e* has four finger elements 100*e*. Alternatively, it is also conceivable for the clamping element holding member 36*e* to have a number of finger elements 100*e* which differs from four, for example one, two, three or more than four finger element(s) 100*e*. The finger elements 100*e* in the radial direction are guided towards the outside by way of the lead throughs 44*e*. The finger elements 100*e* have in each case one clamping protrusion 102*e* on a respective free end of the finger elements 100*e*. The spring element 32*e* bears on the clamping protrusions 102*e*. The spring element 32*e* by way of the clamping protrusions 102*e* exerts a holding force on the friction member 94*e*. The actuating force, in particular a frictional force, in particular between the clamping element holding member 36*e* and the friction member 94*e*, is able to be generated by the spring element 32*e* by way of the clamping element holding member 36*e*.

Figure 11:
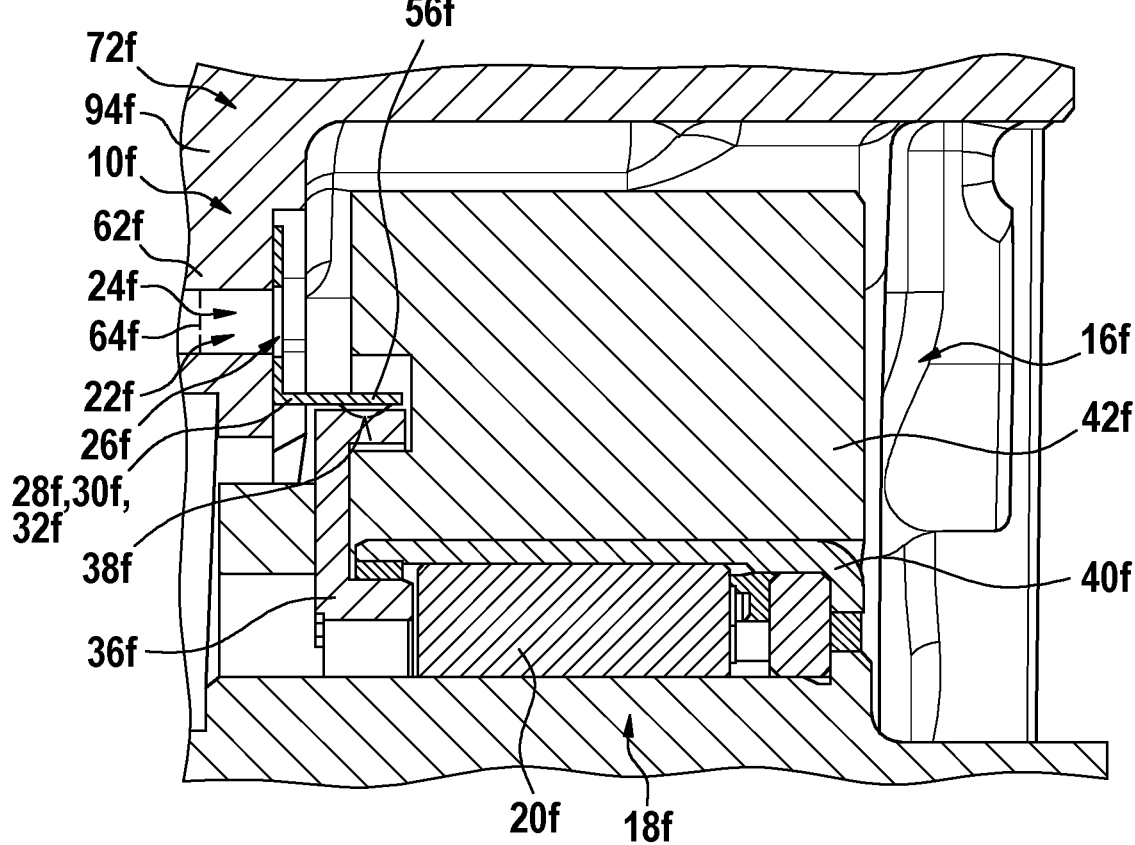
FIG. 11 shows a fragment of a drive device according to the disclosure of a fifth alternative embodiment in a sectional illustration.

FIG. 11 shows a drive device 10*f* for a drive unit (not illustrated here) of an electric bicycle (not illustrated here). The drive device 10*f* has a bidirectional freewheeling assembly 16*f*. The freewheeling assembly 16*f* has at least one clamping element unit 18*f*. The drive device 10*f* comprises at least one force transmission element 42*f* for transmitting a driving force of the drive unit. The clamping element unit 18*f* comprises at least one sleeve 40*f*. The clamping element unit 18*f* comprises a multiplicity of rolling members 20*f* (only one of the rolling members 20*f* is illustrated in FIG. 11).

The clamping element unit 18*f* comprises at least one mechanical control unit 22*f*. The control unit 22*f* has at least one friction unit 24*f* which is provided to generate an actuating force. The friction unit 24*f* has at least one spring unit 26*f*. The clamping element unit 18*f* comprises a clamping element holding member 36*f*. The spring unit 26*f* comprises four spring elements 32*f* (only one of the four spring elements 32*f* is illustrated in FIG. 11). The spring elements 32*f* are configured as flexible springs 28*f*, in particular as leaf springs 30*f*.

The spring elements 32*f* are fastened to a member which is separate from the clamping element holding member 36*f*. The member is a housing component 62*f* of a housing 72*f* of the drive unit. The freewheeling assembly 16*f* has at least one friction member 94*f*. The friction member 94*f* is formed by the housing component 62*f*. The spring elements 32*f* are fastened to the member so as to be releasable, in particular in a non-destructive manner. Alternatively, it is also conceivable for the spring elements 32*f* to be configured so as to be integral to the member, preferably to be at least partially overmoulded by the member. The spring elements 32*f* are in each case fastened to the member, in particular the housing component 62*f*, by way of at least one fastening element 64*f*. The fastening elements 64*f* are configured as screws, bolts, latching members, clamping members, or the like.

The friction unit 24*f* comprises at least one friction face 38*f* which extends in the axial direction. A friction face 38*f*, which extends in the axial direction, is in each case disposed on the spring elements 32*f*. The friction faces 38*f* extending in the axial direction are disposed on a side that faces the clamping element holding member 36*f*. The spring elements 32*f* have in each case one spring arm 56*f*. The respective spring arm 56*f* of the spring elements 32*f* is disposed on the side that faces the clamping element holding member 36*f*, in particular at least when viewed in the axial direction.

Figure 12:
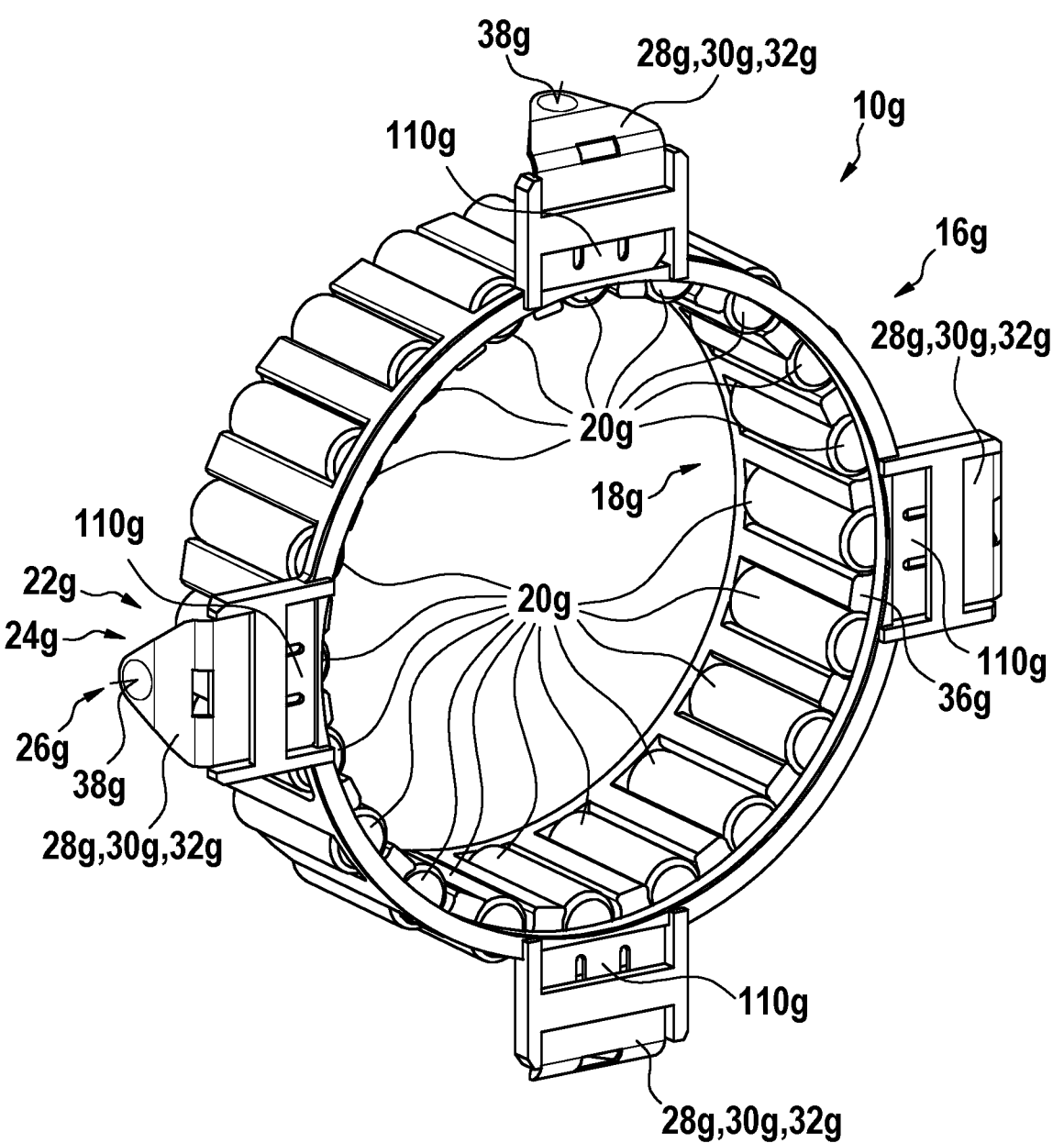
FIG. 12 shows part of a drive device according to the disclosure of a sixth alternative embodiment in a perspective illustration.

FIG. 12 shows a drive device 10*g* for a drive unit (not illustrated here) of an electric bicycle (not illustrated here). The drive device 10*g* has a bidirectional freewheeling assembly 16*g*. The freewheeling assembly 16*g* has at least one clamping element unit 18*g*. The clamping element unit 18*g* comprises at least one clamping element holding member 36*g*. The clamping element unit 18*g* comprises a multiplicity of rolling members 20*g*.

The clamping element unit 18*g* comprises at least one mechanical control unit 22*g*. The control unit 22*g* has at least one friction unit 24*g* which is provided to generate an actuating force. The friction unit 24*g* has at least one spring unit 26*g*. The spring unit 26*g* comprises four spring elements 32*g*. The spring elements 32*g* are configured as flexible springs 28*g*, in particular as leaf springs 30*g*. The spring elements 32*g* are clamped by way of the clamping element holding member 36*g*. The four spring elements 32*g* have in each case in particular one clamping protrusion 102*g*. The clamping protrusions 102*g* are configured in such a manner that in an operating position a deflection of the clamping protrusions 102*g* is able to be generated by an arrangement of the spring elements 32*g* on the clamping element holding member 36*g*. The deflection of the clamping protrusions 102*g* generates a restoring force which acts on the clamping element holding member 36*g* and thus clamps the spring elements 32*f* in particular by way of the clamping element holding member 36*g*. Friction faces 38*g* of the friction unit 24*g* point radially outwards. The friction faces 38*g* are disposed on the spring elements 32*g*.

Figure 13:
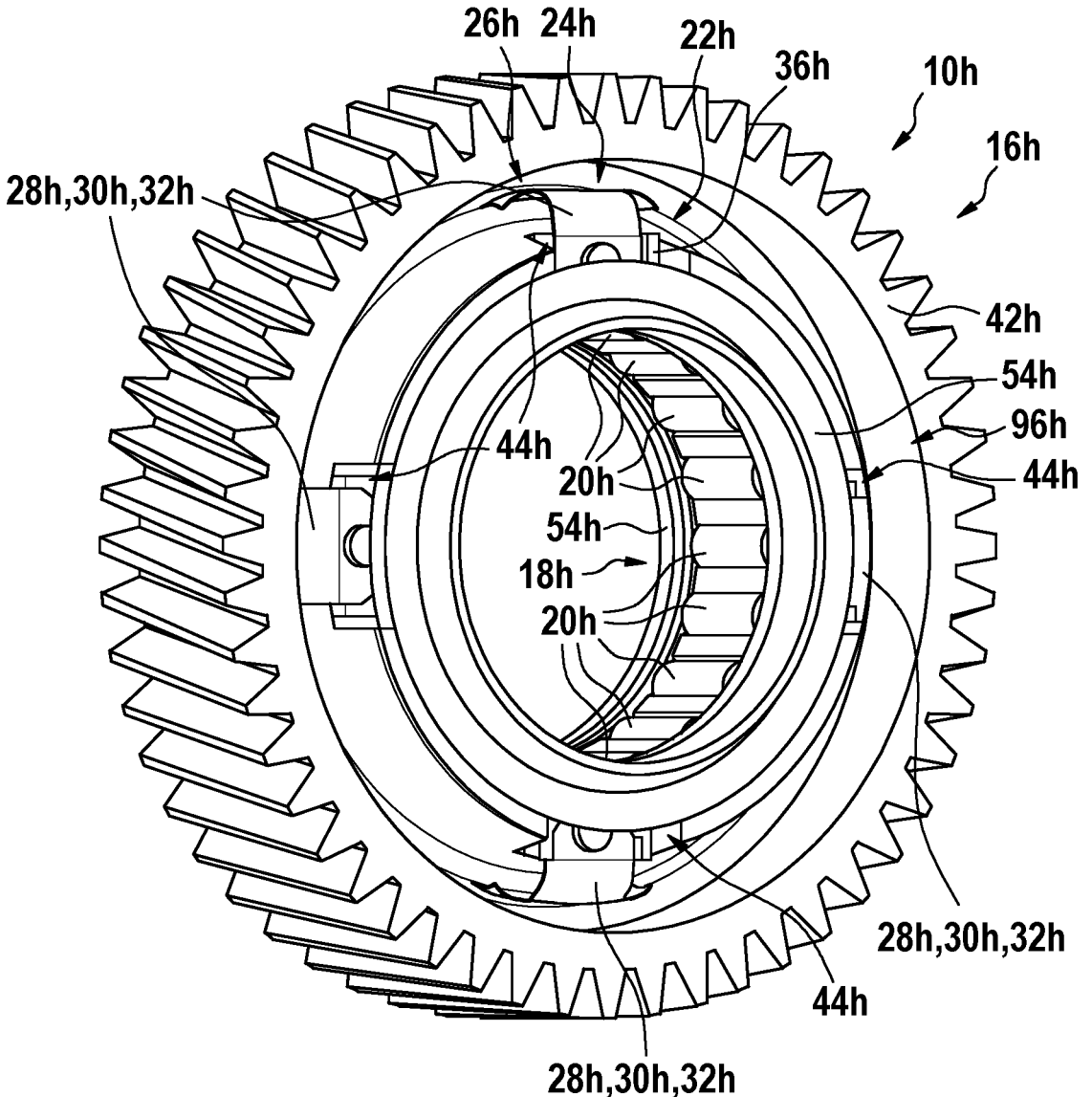
FIG. 13 shows a drive device according to the disclosure of a seventh alternative embodiment in a perspective illustration.
Figure 14:
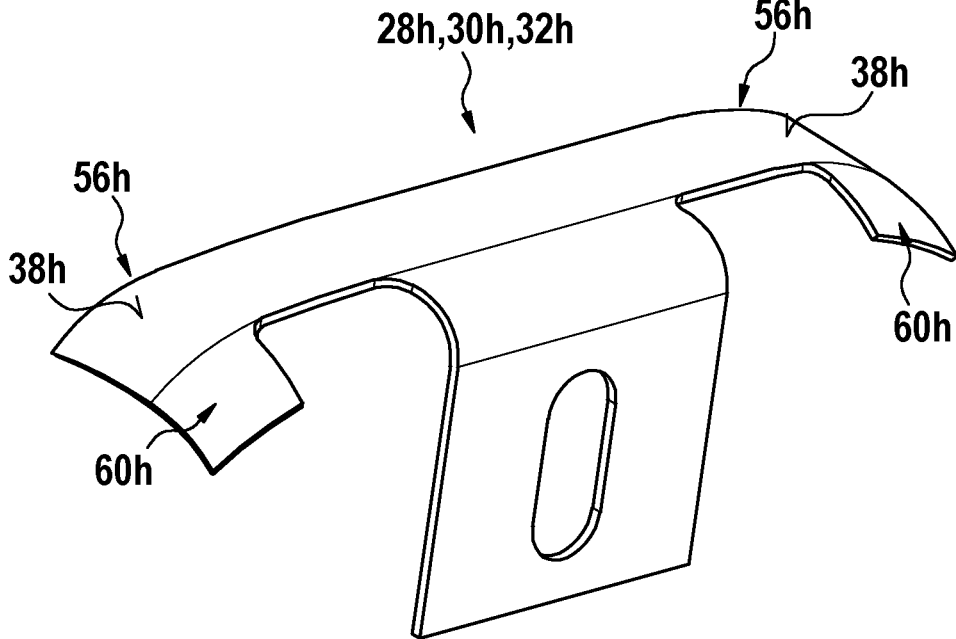
FIG. 14 shows a spring element of the drive device from FIG. 13 in a perspective illustration.

FIG. 13 shows a drive device 10*h* for a drive unit (not illustrated here) of an electric bicycle (not illustrated here). The drive device 10*h* comprises at least one force transmission element 42*h* for transmitting a driving force of the drive unit. The drive device 10*h* comprises at least one bearing unit. The drive device 10*h* comprises at least one bearing unit 96*h*. The bearing unit 96*h* is at least provided to mount the force transmission element 42*h* and a shaft (not illustrated here) of the drive device 10*h* so as to be mutually rotatable and/or at a fixed radial spacing relative to one another. The bearing unit 96*h* comprises at least two bearing elements 54*h*. The drive device 10*h* has a bidirectional freewheeling assembly 16*h*.

The clamping element unit 18*h* comprises at least one clamping element holding member 36*h*. The clamping element unit 18*h* comprises a multiplicity of rolling members 20*h*. The force transmission element 42*h* has four lead throughs 44*h* by way of which the clamping element holding member 36*h* in the radial direction is at least partially guided towards the outside. The freewheeling assembly 16*h* has at least one clamping element unit 18*h*. The clamping element unit 18*h* comprises at least one mechanical control unit 22*h*. The control unit 22*h* has at least one friction unit 24*h* which is provided to generate an actuating force. The friction unit 24*h* has at least one spring unit 26*h*.

The spring unit 26*h* has four spring elements 32*h*. The four spring elements 32*h* have in each case two assembly ramps 60*h* (cf. FIG. 14). Alternatively, it is also conceivable for the spring elements 32*h* to have in each case only one assembly ramp 60*h* or more than two assembly ramps 60*h*. The assembly ramps 60*h* are provided to guide the spring elements 32*h* when assembling the spring elements 32*h* on a friction member (not illustrated here). The assembly ramps 60*h* are provided to contact the friction member during the assembly of the spring elements 32*h* on the friction member and, in particular, to guide the spring elements 32*h* in a movement in the direction of an envisaged assembly position. The assembly ramps 60*h* are disposed on spring arms 56*h* of the spring elements 32*h*. The spring elements 32*h* are configured as flexible springs 28*h*, in particular as leaf springs 30*h*.

Friction faces 38*h* of the friction unit 24*h* are disposed on the spring elements 32*h*. The friction faces 38*h* extend in the axial direction. The friction faces 38*h* extending in the axial direction, when viewed in the radial direction, are oriented outwards.

The invention claimed is:

1. A drive device for a drive unit of an electric bicycle, comprising:
   a bidirectional freewheeling assembly including at least one clamping element unit,
   wherein the at least one clamping element unit includes (i) a mechanical control unit having a friction unit, and (ii) a clamping element holding member,
   wherein the friction unit is configured to generate an actuating force, and
   wherein the friction unit includes (i) at least one spring unit, and (ii) at least two friction elements configured to generate the actuating force.

2. The drive device according to claim 1, wherein the at least one clamping element unit is configured to decouple vibrations of a wrapping mechanism.

3. The drive device according to claim 1, wherein the at least one clamping element unit comprises at least one rolling member.

4. The drive device according to claim 3, further comprising:
    a force transmission element configured to transmit a driving force of the drive unit,
    wherein a value of a maximum diameter of the at least one rolling member is between 6% and 20% of a value of a maximum internal diameter of the force transmission element.

5. The drive device according to claim 3, further comprising:
    a shaft,
    wherein a value of a maximum diameter of the at least one rolling member is between 8% and 25% of a value of a maximum diameter of the shaft.

6. The drive device according to claim 1, wherein the at least one spring unit has at least one spring element with at least one assembly ramp.

7. The drive device according to claim 1, wherein the at least one spring unit has at least one spring element configured separately from the clamping element holding member.

8. The drive device according to claim 1, the at least one spring unit has at least one spring element overmoulded by the clamping element holding member.

9. The drive device according to claim 1, the at least one spring unit has at least one spring element configured so as to be integral to the clamping element holding member.

10. The drive device according to claim 1, wherein:
    the friction unit has a friction face extending in an axial direction, and the friction face, when viewed in the axial direction, is disposed on a side that faces the clamping element holding member.

11. The drive device according to claim 10, wherein the friction face, when viewed in a radial direction, is aligned towards an inside.

12. The drive device according to claim 1, wherein:
    the friction unit has a friction face extending in an axial direction, and
    the friction face, when viewed in the axial direction, is disposed on a side that faces away from the clamping element holding member.

13. The drive device according to claim 1, wherein the at least two friction elements are disposed uniformly in a circumferential direction of the clamping element holding member.

14. The drive device according to claim 1, further comprising:
    a force transmission element configured to generate a driving force of the drive unit, the force transmission element configured as a spur gear.

15. The drive device according to claim 1, further comprising:
    a force transmission element configured to transmit a driving force of the drive unit,
    wherein the at least one clamping element unit and the force transmission element have a common section plane which runs so as to be at least substantially perpendicular to a rotation axis of the bidirectional freewheeling assembly.

16. A drive unit for an electric bicycle, comprising:
the drive device of claim 1.

17. An electric bicycle, comprising:
the drive unit of claim 16.

18. A drive device for a drive unit of an electric bicycle, comprising:
    a bidirectional freewheeling assembly including at least one clamping element unit,
    wherein the at least one clamping element unit includes a mechanical control unit having a friction unit,
    wherein the friction unit has at least one spring unit,
    wherein the friction unit is configured to generate an actuating force,
    wherein the at least one clamping element unit comprises a clamping element holding member, and
    wherein the at least one spring unit has at least one spring element fastened to a member that is separate from the clamping element holding member.

19. A drive device for a drive unit of an electric bicycle, comprising:
    a bidirectional freewheeling assembly including at least one clamping element unit,
    wherein the at least one clamping element unit includes a mechanical control unit having a friction unit,
    wherein the friction unit has at least one spring unit,
    wherein the friction unit is configured to generate an actuating force,
    wherein the at least one clamping element unit comprises a clamping element holding member, and
    wherein the at least one spring unit has at least one spring element which is fastened to the clamping element holding member.

20. A drive device for a drive unit of an electric bicycle, comprising:
    a bidirectional freewheeling assembly including at least one clamping element unit; and
    a force transmission element configured to transmit a driving force of the drive unit, the force transmission element including at least one lead through slot,
    wherein the at least one clamping element unit comprises (i) a clamping element holding member defining a circular periphery and a plurality of spaces configured to receive a plurality of rolling members, and (ii) at least one spring support structure extending radially outward from the clamping element holding member, and
    wherein the at least one spring support structure is (i) fixedly positioned relative to the clamping element holding member, and (ii) is positioned in the at least one lead through slot.

* * * * *